(12) United States Patent
Hashimoto

(10) Patent No.: US 6,714,686 B2
(45) Date of Patent: Mar. 30, 2004

(54) IMAGE PROCESSING DEVICE

(75) Inventor: Takumi Hashimoto, Sakurai (JP)

(73) Assignee: Sharp Kabushiki Kaisha, Osaka (JP)

(*) Notice: Subject to any disclaimer, the term of this patent is extended or adjusted under 35 U.S.C. 154(b) by 575 days.

(21) Appl. No.: 09/808,184

(22) Filed: Mar. 15, 2001

(65) Prior Publication Data

US 2002/0015445 A1 Feb. 7, 2002

(30) Foreign Application Priority Data

Mar. 24, 2000 (JP) .......................... 2000-085376

(51) Int. Cl.$^7$ .............................. G06K 9/36; G06K 9/46
(52) U.S. Cl. ......................................... 382/250; 382/233
(58) Field of Search ................................ 382/233, 250, 382/251, 246, 303, 307; 711/104, 105, 149, 155; 365/189.04, 230.05

(56) References Cited

U.S. PATENT DOCUMENTS 5,313,299 A * 5/1994 Ishihara ................. 365/189.04
5,555,511 A * 9/1996 Ooi ........................ 365/230.05
5,623,311 A * 4/1997 Phillips et al. ........... 375/240.25
5,630,033 A * 5/1997 Purcell et al. ........... 375/240.15
5,699,117 A * 12/1997 Uramoto et al. ......... 348/390.1

FOREIGN PATENT DOCUMENTS

| JP | A3076398 | 4/1991 |
| JP | A10334225 | 12/1998 |

* cited by examiner

Primary Examiner—Phuoc Tran
(74) Attorney, Agent, or Firm—Birch, Stewart, Kolasch & Birch, LLP

(57) ABSTRACT

An image processing device includes an encoding control section which outputs a DCT start signal (DCTSTART), a quantizing start signal (QSTART), and a Huffman encoding start signal (HUFFSTART). It further includes a two-port memory, which has a writing port and a reading port independent from each other. In the case where the data for one block is written into the memory according to a column direction, and the data for one block is read out from the memory according to a zigzag-scan order or an alternate-scan order, a time difference between a time to start writing the data into the memory and a time to start reading the data from the memory is controlled such that all of the data written into the memory can be read out.

11 Claims, 23 Drawing Sheets

| Order | S | | | | | | | | | | | | | | | → ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | → ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | 1 | 9 | 2 |
| Order | ② | | | | | | | | | | | | | | | → ③ |
| Write address | 33 | 34 | 35 | 36 | 37 | 38 | 39 | 40 | 41 | 42 | 43 | 44 | 45 | 46 | 47 | 48 |
| Read address | 3 | 10 | 17 | 25 | 18 | 11 | 4 | 5 | 12 | 19 | 26 | 33 | 41 | 34 | 27 | 20 |
| Order | ③ | | | | | | | | | | | | | | | → ④ |
| Write address | 49 | 50 | 51 | 52 | 53 | 54 | 55 | 56 | 57 | 58 | 59 | 60 | 61 | 62 | 63 | 64 |
| Read address | 13 | 6 | 7 | 14 | 21 | 28 | 35 | 42 | 49 | 57 | 50 | 43 | 36 | 29 | 22 | 15 |
| Order | ④ | | | | | | | | | | | | | | | → ⑤ |
| Write address | | | | | | | | | | | | | | | | |
| Read address | 8 | 16 | 23 | 30 | 37 | 44 | 51 | 58 | 59 | 52 | 45 | 38 | 31 | 24 | 32 | 39 |
| Order | ⑤ | | | | | | | | → | E | | | | | | |
| Write address | | | | | | | | | | | | | 1 | 2 | 3 | |
| Read address | 46 | 53 | 60 | 61 | 54 | 47 | 40 | 48 | 55 | 62 | 63 | 56 | 64 | | | |

S: Start of writing   E: End of reading

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | 1 | 9 | 2 | 3 |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | 10 | 17 | 25 | 18 | 11 | 4 | 5 | 12 | 19 | 26 | 33 | 41 | 34 | 27 | 20 | 13 |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 6 | 7 | 14 | 21 | 28 | 35 | 42 | 49 | 57 | 50 | 43 | 36 | 29 | 22 | 15 | 8 |
| Order | ④ | | | | | | | | | | | | | | | ⑤ |
| Write address | | | | | | | | | | | | | | | | |
| Read address | 16 | 23 | 30 | 37 | 44 | 51 | 58 | 59 | 52 | 45 | 38 | 31 | 24 | 32 | 39 | 46 |
| Order | ⑤ | | | | | | | | E | | | | | | | |
| Write address | | | | | | | | | | | | | 1 | 2 | 3 | 4 |
| Read address | 53 | 60 | 61 | 54 | 47 | 40 | 48 | 55 | 62 | 63 | 56 | 64 | | | | |

S: Start of writing   E: End of reading

FIG. 4A $\beta = 0, \quad \alpha = 35$

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | | | |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | | | 1 | 9 | 2 | 3 | 10 | 17 | 25 | 18 | 11 | 4 | 5 | 12 | 19 |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 26 | 33 | 41 | 34 | 27 | 20 | 13 | 6 | 7 | 14 | 21 | 28 | 35 | 42 | 49 | 57 |
| Order | ④ | | | | | | | | | | | | | | | ⑤ |
| Write address | 1 | 2 | 3 | 4 | 5 | 6 | 7 | 8 | 9 | 10 | 11 | 12 | 13 | 14 | 15 | 16 |
| Read address | 50 | 43 | 36 | 29 | 22 | 15 | 8 | 16 | 23 | 30 | 37 | 44 | 51 | 58 | 59 | 52 |
| Order | ⑤ | | | | | | | | | | | | | | | ⑥ |
| Write address | 17 | 18 | 19 | 20 | 21 | 22 | 23 | 24 | 25 | 26 | 27 | 28 | 29 | 30 | 31 | 32 |
| Read address | 45 | 38 | 31 | 24 | 32 | 39 | 46 | 53 | 60 | 61 | 54 | 47 | 40 | 48 | 55 | 62 |
| Order | ⑥ | E | | | | | | | | | | | | | | |
| Write address | 33 | 34 | 35 | 36 | 37 | 38 | 39 | 40 | 41 | 42 | 43 | 44 | 45 | 46 | 47 | 48 |
| Read address | 63 | 56 | 64 | | | | | | | | | | | | | |

S: Start of writing   E: End of reading

FIG.4B $\beta = 0, \quad \alpha = 36$

| Order | S | | | | | | | | | | | | | | | ➤① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ➤② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | | | |
| Order | ② | | | | | | | | | | | | | | | ➤③ |
| Write address | 33 | 34 | 35 | 36 | 37 | 38 | 39 | 40 | 41 | 42 | 43 | 44 | 45 | 46 | 47 | 48 |
| Read address | | | 1 | 9 | 2 | 3 | 10 | 17 | 25 | 18 | 11 | 4 | 5 | 12 | | |
| Order | ③ | | | | | | | | | | | | | | | ➤④ |
| Write address | 49 | 50 | 51 | 52 | 53 | 54 | 55 | 56 | 57 | 58 | 59 | 60 | 61 | 62 | 63 | 64 |
| Read address | 19 | 26 | 33 | 41 | 34 | 27 | 20 | 13 | 6 | 7 | 14 | 21 | 28 | 35 | 42 | 49 |
| Order | ④ | | | | | | | | | | | | | | | ➤⑤ |
| Write address | 1 | 2 | 3 | 4 | 5 | 6 | 7 | 8 | 9 | 10 | 11 | 12 | 13 | 14 | 15 | 16 |
| Read address | 57 | 50 | 43 | 36 | 29 | 22 | 15 | 8 | 16 | 23 | 30 | 37 | 44 | 51 | 58 | 59 |
| Order | ⑤ | | | | | | | | | | | | | | | ➤⑥ |
| Write address | 17 | 18 | 19 | 20 | 21 | 22 | 23 | 24 | 25 | 26 | 27 | 28 | 29 | 30 | 31 | 32 |
| Read address | 52 | 45 | 38 | 31 | 24 | 32 | 39 | 46 | 53 | 60 | 61 | 54 | 47 | 40 | 48 | 55 |
| Order | ⑥ | ➤E | | | | | | | | | | | | | | |
| Write address | 33 | 34 | 35 | 36 | 37 | 38 | 39 | 40 | 41 | 42 | 43 | 44 | 45 | 46 | 47 | 48 |
| Read address | 62 | 63 | 56 | 64 | | | | | | | | | | | | |

S: Start of writing    E: End of reading

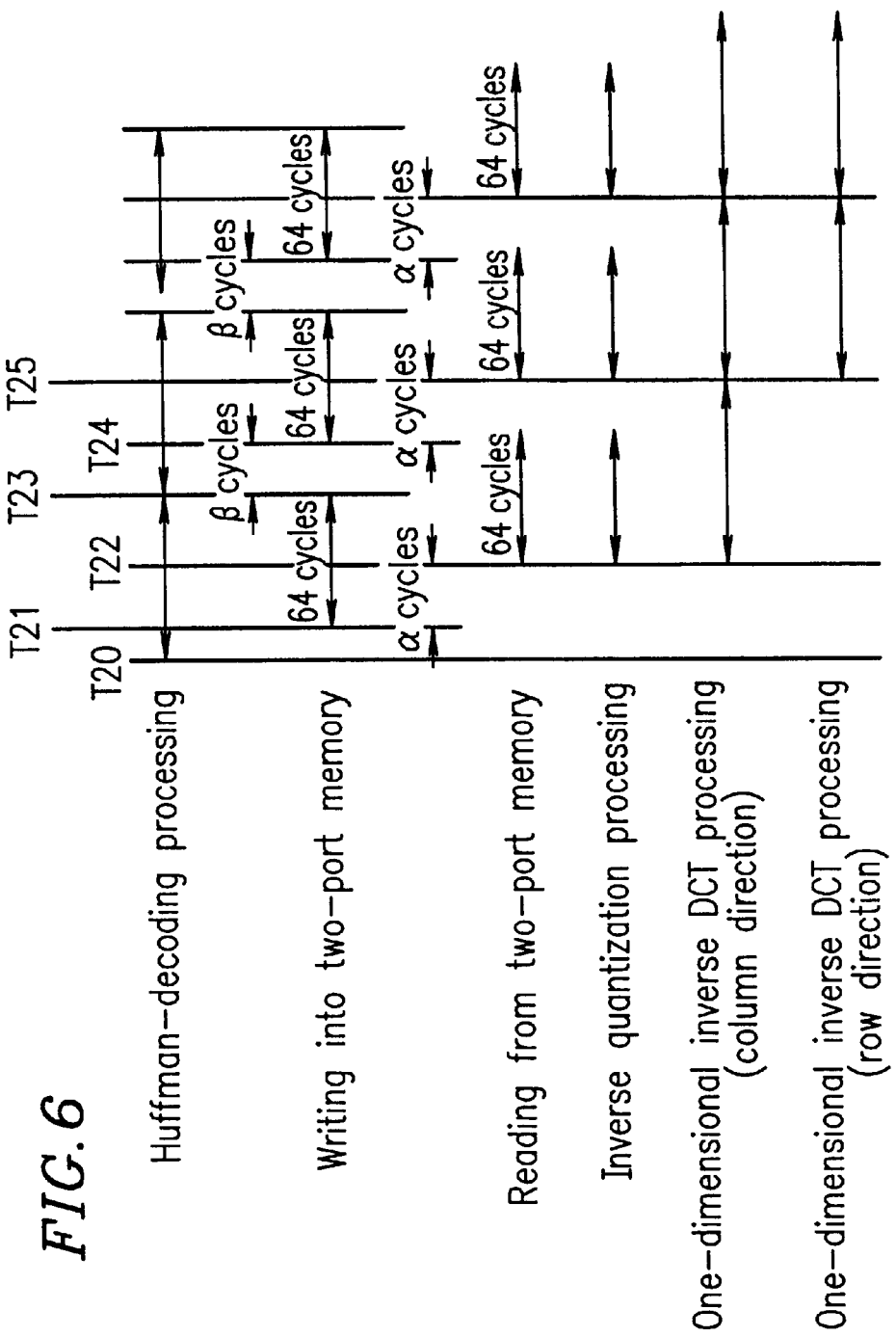

FIG. 7A $\beta = 29, \alpha = 29$

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | 1 | 3 | 4 |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | 10 | 11 | 21 | 22 | 36 | 2 | 5 | 9 | 12 | 20 | 23 | 35 | 37 | 6 | 8 | 13 |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 19 | 24 | 34 | 38 | 49 | 7 | 14 | 18 | 25 | 33 | 39 | 48 | 50 | 15 | 17 | 26 |
| Order | ④ | | | | | | | | | | | | | | | ⑤ |
| Write address | | | | | | | | | | | | | | | | |
| Read address | 32 | 40 | 47 | 51 | 58 | 16 | 27 | 31 | 41 | 46 | 52 | 57 | 59 | 28 | 30 | 42 |
| Order | ⑤ | | | | | | | | | | | | E | | | |
| Write address | | | | | | | | | | | | | | 1 | 2 | 3 |
| Read address | 45 | 53 | 56 | 60 | 63 | 29 | 43 | 44 | 54 | 55 | 61 | 62 | 64 | | | |

S: Start of writing    E: End of reading

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | 1 | 3 | 4 | 10 |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | 11 | 21 | 22 | 36 | 2 | 5 | 9 | 12 | 20 | 23 | 35 | 37 | 6 | 8 | 13 | 19 |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 24 | 34 | 38 | 49 | 7 | 14 | 18 | 25 | 33 | 39 | 48 | 50 | 15 | 17 | 26 | 32 |
| Order | ④ | | | | | | | | | | | | | | | ⑤ |
| Write address | | | | | | | | | | | | | | | | |
| Read address | 40 | 47 | 51 | 58 | 16 | 27 | 31 | 41 | 46 | 52 | 57 | 59 | 28 | 30 | 42 | 45 |
| Order | ⑤ | | | | | | | | | E | | | | | | |
| Write address | | | | | | | | | | | | | 1 | 2 | 3 | 4 |
| Read address | 53 | 56 | 60 | 63 | 29 | 43 | 44 | 54 | 55 | 61 | 62 | 64 | | | | |

S: Start of writing    E: End of reading

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | | | |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | | | 1 | 3 | 4 | 10 | 11 | 21 | 22 | 36 | 2 | 5 | 9 | 12 | 20 | |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 23 | 35 | 37 | 6 | 8 | 13 | 19 | 24 | 34 | 38 | 49 | 7 | 14 | 18 | 25 | 33 |
| Order | ④ | | | | | | | | | | | | | | | ⑤ |
| Write address | 1 | 2 | 3 | 4 | 5 | 6 | 7 | 8 | 9 | 10 | 11 | 12 | 13 | 14 | 15 | 16 |
| Read address | 39 | 48 | 50 | 15 | 17 | 26 | 32 | 40 | 47 | 51 | 58 | 16 | 27 | 31 | 41 | 46 |
| Order | ⑤ | | | | | | | | | | | | | | | ⑥ |
| Write address | 17 | 18 | 19 | 20 | 21 | 22 | 23 | 24 | 25 | 26 | 27 | 28 | 29 | 30 | 31 | 32 |
| Read address | 52 | 57 | 59 | 28 | 30 | 42 | 45 | 53 | 56 | 60 | 63 | 29 | 43 | 44 | 54 | 55 |
| Order | ⑥ | E | | | | | | | | | | | | | | |
| Write address | 33 | 34 | 35 | 36 | 37 | 38 | 39 | 40 | 41 | 42 | 43 | 44 | 45 | 46 | 47 | 48 |
| Read address | 61 | 62 | 64 | | | | | | | | | | | | | |

S: Start of writing   E: End of reading

| Order | S | | | | | | | | | | | | | | | ① |
|---|---|---|---|---|---|---|---|---|---|---|---|---|---|---|---|---|
| Write address | 1 | 2 | 3 | 4 | 5 | 6 | 7 | 8 | 9 | 10 | 11 | 12 | 13 | 14 | 15 | 16 |
| Read address | | | | | | | | | | | | | | | | |
| Order | ① | | | | | | | | | | | | | | | ② |
| Write address | 17 | 18 | 19 | 20 | 21 | 22 | 23 | 24 | 25 | 26 | 27 | 28 | 29 | 30 | 31 | 32 |
| Read address | | | | | | | | | | | | | | | | |
| Order | ② | | | | | | | | | | | | | | | ③ |
| Write address | 33 | 34 | 35 | 36 | 37 | 38 | 39 | 40 | 41 | 42 | 43 | 44 | 45 | 46 | 47 | 48 |
| Read address | | | | | 1 | 3 | 4 | 10 | 11 | 21 | 22 | 36 | 2 | 5 | 9 | 12 |
| Order | ③ | | | | | | | | | | | | | | | ④ |
| Write address | 49 | 50 | 51 | 52 | 53 | 54 | 55 | 56 | 57 | 58 | 59 | 60 | 61 | 62 | 63 | 64 |
| Read address | 20 | 23 | 35 | 37 | 6 | 8 | 13 | 19 | 24 | 34 | 38 | 49 | 7 | 14 | 18 | 25 |
| Order | ④ | | | | | | | | | | | | | | | ⑤ |
| Write address | 1 | 2 | 3 | 4 | 5 | 6 | 7 | 8 | 9 | 10 | 11 | 12 | 13 | 14 | 15 | 16 |
| Read address | 33 | 39 | 48 | 50 | 15 | 17 | 26 | 32 | 40 | 47 | 51 | 58 | 16 | 27 | 31 | 41 |
| Order | ⑤ | | | | | | | | | | | | | | | ⑥ |
| Write address | 17 | 18 | 19 | 20 | 21 | 22 | 23 | 24 | 25 | 26 | 27 | 28 | 29 | 30 | 31 | 32 |
| Read address | 46 | 52 | 57 | 59 | 28 | 30 | 42 | 45 | 53 | 56 | 60 | 63 | 29 | 43 | 44 | 54 |
| Order | ⑥ | E | | | | | | | | | | | | | | |
| Write address | 33 | 34 | 35 | 36 | 37 | 38 | 39 | 40 | 41 | 42 | 43 | 44 | 45 | 46 | 47 | 48 |
| Read address | 55 | 61 | 62 | 64 | | | | | | | | | | | | |

S: Start of writing   E: End of reading

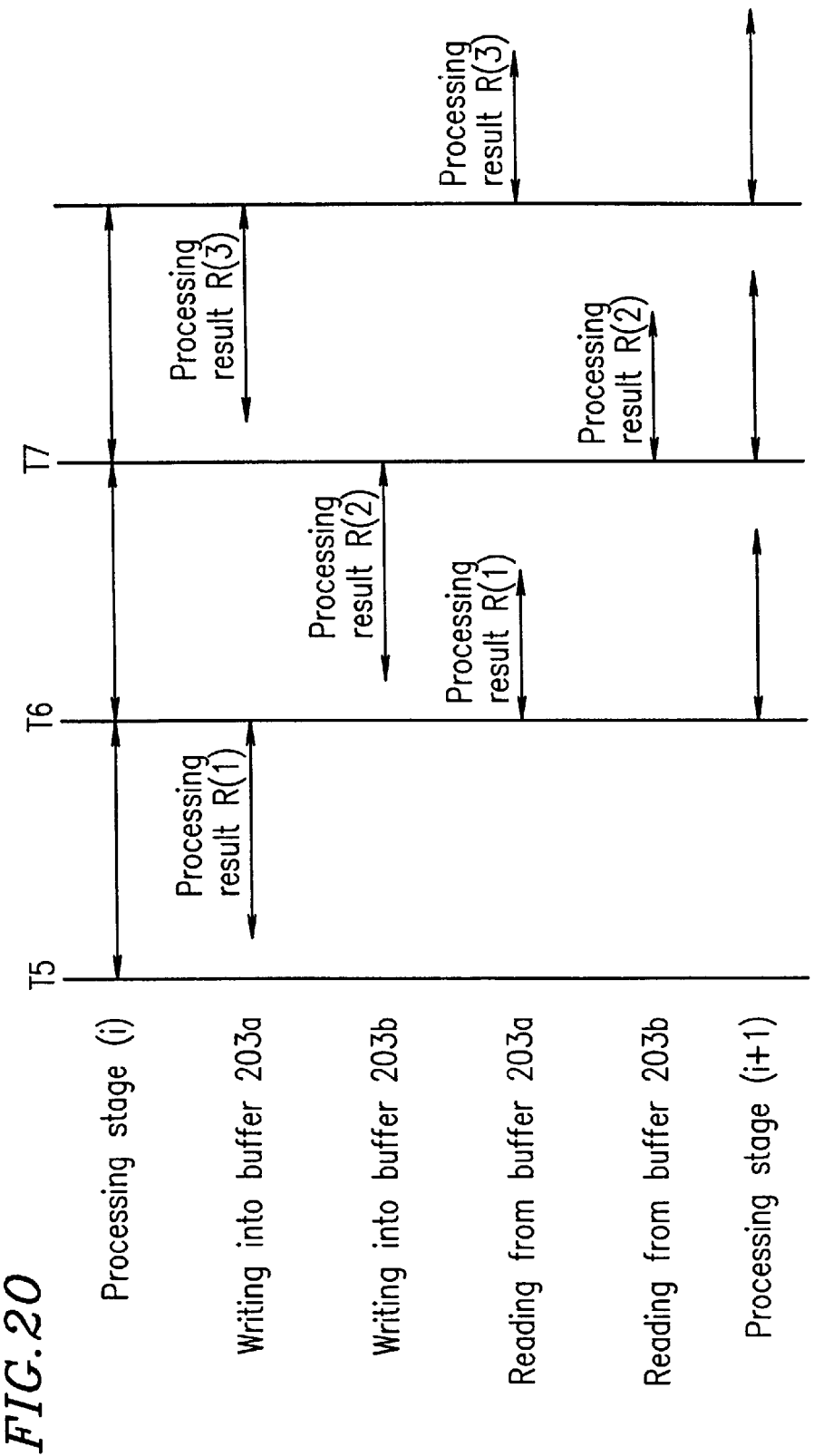

IMAGE PROCESSING DEVICE

BACKGROUND OF THE INVENTION

1. Field of the Invention

The present invention relates to an image processing device for use in, e.g., a digital still camera, a facsimile machine, a digital copy machine, a videophone, a video CD player, a DVD player, etc. Specifically, the present invention relates to an image processing device which achieves an increase in the processing speed of pipeline image processing performed between discrete cosine transform processing/inverse discrete cosine transform processing and Huffman-encoding processing/Huffman-decoding processing for compression/expansion of color images; accurate encoding/decoding; and a decrease in circuitry size.

In the description hereinbelow, a discrete cosine transform is referred to as "DCT", and an inverse discrete cosine transform is referred to as an "inverse DCT".

2. Description of the Related Art

There are standards for high efficiency image encoding processing (data compression processing for image information) provided by a plurality of organizations, whereby compatibility of compressed data among various applicable fields is secured. For example, in the field of electronic communications, there is the H. 261 standard (which is a CCITT recommendation). Furthermore, in the field of recording technology, the International Standards Organization (ISO) standardize an MPEG as dynamic image encoding processing and a JPEG as still image encoding processing.

In encoding processing based on such standards, as shown in FIG. 10, encoding processing for dynamic images is achieved by a combination of a plurality of unit processing algorithms.

In the standardized dynamic image encoding processing as shown in FIG. 10, captured image information is converted into an electric signal by a charge coupled device (CCD) 1, and the electric signal is digitally converted by an A/D converter 2. The digitally converted image data is supplied to a motion estimation processing section 3. The motion estimation processing section 3 compares the image data from the A/D converter 2 with data output from a frame memory 12 in which preceding frame images are accumulatively stored to determine an optimum one of the preceding frame images in the frame memory 12. Output data from the motion estimation processing section 3 is subjected to a frame differential process 4, and supplied to a DCT processing section 5.

The DCT processing section 5 divides an image corresponding to the supplied image data into blocks each having a particular size, and DCT processes the image data on a block-by-block basis. In a quantization processing section 6, the DCT-processed image data is quantized according to a quantization factor into image data components. The image data components are compressed by Huffman-encoding processing in a Huffman-encoding processing section 7. The compressed image data components are recorded in a recording section 8.

On the other hand, in an inverse quantization processing section 9, the image data components obtained in the quantization processing section 6 are inversively quantized according to the above quantization factor into image data. The inversively quantized image data is output to an inverse DCT processing section 10. The inverse DCT processing section 10 inversively DCT-processes the inversively quantized image data on the block-by-block basis. The inversively DCT-processed image data is subjected to addition processing with the optimum one of the proceeding frame images which has been determined by the motion estimation processing section 3, and is accumulated in a frame memory 12. Frame image data in the frame memory 12 is fed back to the motion estimation processing section 3 for subsequent motion estimation processing.

Furthermore, standardized encoding/decoding processing for still images is achieved by a combination of a plurality of unit processing algorithms as shown in FIG. 11.

In the standardized encoding/decoding processing for still images shown in FIG. 11, captured image information is converted by a CCD 1 into an electric signal, and the electric signal is digitally converted by an A/D converter 2. The image data digitally converted by the A/D converter 2 is output to a DCT processing section 5. The DCT processing section 5 divides an image of the image data into a plurality of blocks each having a particular size, and DCT-processes the image data on block-by-block basis.

In a quantization processing section 6, the image data which has been DCT-processed in the DCT processing section 5 is quantized according to a quantization factor into image data components. The image data components are compressed by Huffman-encoding processing in a Huffman-encoding processing section 7. The compressed image data components obtained in the Huffman-encoding processing section 7 are recorded in a recording section 8.

On the other hand, in the case where the compressed image data components recorded in the recording section 8 are decompressed to reproduce the original captured image, the compressed image data components are read out from the recording section 8 and decoded in a Huffman-decoding processing section 13, whereby the compressed data components are converted into image data components. These image data components are inversively quantized by an inverse quantization processing section 9, whereby the image data components are converted into image data. This image data is output to an inverse DCT processing section 10. The inverse DCT processing section 10 inversively DCT-processes the image data on the block-by-block basis, thereby reproducing an image which is substantially the same as the original captured image.

In the encoding process for dynamic images shown in FIG. 10, in almost all the processing performed in the motion estimation processing section 3 and the downstream sections thereof, an entire image is divided into a mesh-like matrix formed by a plurality of image regions, and each type of processing is performed on each image region. Also in the encoding/decoding process for still images shown in FIG. 11, in almost all the processing performed in the DCT processing section 5 and the downstream sections thereof, an entire image is divided into a mesh-like matrix formed by a plurality of image regions, and each type of processing is performed on each image region. There are two types of image region-based processing; an image is processed on the units of a region formed by 8×8 pixels (a block) (e.g., processing in the DCT processing section 5); or an image is processed on the units of a region formed by 16×16 pixels (a macroblock) (e.g., a processing in the motion estimation processing section 3). Hereinbelow, processing on the units of an 8×8 pixel region (on the block-by-block basis) is described in detail.

In the encoding process, image data is sequentially input to the DCT processing section 5 on the block-by-block basis (i.e., on the units of an 8×8 pixel region). In the DCT processing section 5, DCT processing is performed on the image data (two-dimensional image information) on the block-by-block basis (i.e., on the units of an 8×8 pixel region). This two-dimensional DCT processing is performed by executing one-dimensional DCT processing in a horizontal (row) direction and one-dimensional DCT processing in a vertical (column) direction. The two-dimensional DCT processing on the units of an 8×8 pixel region is represented by following arithmetic expression (1):

$$F(U,V)=(\tfrac{1}{4})C(U)C(V)\Sigma\Sigma f(i,j)\cos[(2i+1)U\pi/16]\cos[(2j+1)V\pi/16] \quad (1)$$

where f(i,j) is pixel data, and the initial value for i and j is 0. In expression (1),
when U=0, C(U)=1/√2;
when U≠0, C(U)=1;
when V=0, C(V)=1/√2; and
when V≠0, C(V)=1.

Data Fuv which has been obtained after the two-dimensional DCT processing is output to the quantization processing section 6. The quantization processing section 6 quantizes the two-dimensional DCT processed data Fuv according to a quantization factor Quv as shown by expression (2):

$$Suv=Fuv/Quv \quad (2)$$

where Suv denotes an image data component obtained after quantization processing.

As described above, in the two-dimensional DCT processing in the DCT processing section 5, the one-dimensional DCT processing according to the column direction order is performed after the one-dimensional DCT processing according to the row direction order. Then, the results of the one-dimensional DCT processing according to the column direction order, i.e., data Fuv, are sequentially supplied according to the row direction order to the quantization processing section 6 for conversion into an image data component Suv. Thus, in the quantization processing section 6, quantization processing is performed for the two-dimensional image data from the DCT processing section 5 on the units of a block formed by 8×8 pixels according to the column direction order. The column direction order is shown in FIG. 12.

The image data components obtained after the quantization processing in the quantization processing section 6 are output to the Huffman-encoding processing section 7 according to the column direction order shown in FIG. 12. In the Huffman-encoding processing section 7, the order of the Huffman-encoding processing is a zigzag-scan order or an alternate-scan order. Therefore, data output from the quantization processing section 6 should be converted so as to comply with the zigzag-scan order or the alternate-scan order. The zigzag-scan order is shown in FIG. 13, and the alternate-scan order is shown in FIG. 14. The image data which has been compressed by the Huffman-encoding processing is recorded in the recording section 8.

On the other hand, in the case where the compressed image data recorded in the recording section 8 is decompressed to reproduce the original captured image, the compressed image data is read out from the recording section 8 and decoded in a Huffman-decoding processing section 13, whereby the compressed image data is converted into image data component Suv. The image data component obtained by the Huffman-decoding processing is output according to the zigzag-scan order or the alternate-scan order. The image data component Suv output from the Huffman-decoding processing section 13 is inversively quantized according to a quantization factor Quv in the inverse quantization processing section 9 as shown by expression (3):

$$Fuv=Quv\times Suv \quad (3)$$

where Fuv represents an inversively quantized image data component.

The image data from the inverse quantization processing section 9 is sequentially input to the inverse DCT processing section 10 on the block-by-block basis (i.e., on the units of an 8×8 pixel region). In the inverse DCT processing section 10, inverse DCT processing is performed on each block (8×8 pixel region) of the two-dimensional image data. This two-dimensional inverse DCT processing is performed by executing one-dimensional inverse DCT processing in a horizontal (row) direction and one-dimensional inverse DCT processing in a vertical (column) direction. The two-dimensional DCT processing performed on an 8×8 pixel region is represented by following arithmetic expression (4):

$$f(i,j) \; (\tfrac{1}{4})\Sigma\Sigma C(x)C(y)F(x,y)\cos[(2i+1)x\pi/16]\cos[(2j+1)y\pi/16] \quad (4)$$

where F(x,y) is pixel data, and the initial value for x and y is 0. In expression (4),
when x=0, C(x)=1/√2;
when x≠0, C(x)=1;
when y=0, C(y)=1/√2; and
when y≠0, C(y)=1.

In the processing for the two-dimensional image data on the block-by-block basis (i.e., on the units of an 8×8 pixel region) in the inverse quantization processing section 9, each block is processed in the same processing order as that of the one-dimensional inverse DCT processing in the vertical (column) direction of image data in the inverse DCT processing section 10 as shown in FIG. 12.

As seen from the above, the data output order from the quantization processing section 6 and the data input order in the inverse quantization processing section 9 are as shown in FIG. 12; on the other hand, the data input order in the Huffman-encoding processing section 7 and the data output order from the Huffman-decoding processing section 13 are the zigzag-scan order (FIG. 13) or the alternate-scan order (FIG. 14). Accordingly, a buffer memory for a primary memory is required for pipeline processing between the quantization processing section 6 and the Huffman-encoding processing section 7, and between the Huffman-decoding processing section 13 and the inverse quantization processing section 9. Therefore, it is difficult to increase the speed of the pipeline processing, and to correctly perform encoding/decoding processing because the buffer memory is used for the primary memory. Moreover, it is difficult to reduce the size of the circuitry.

Methods for increasing the speed of pipeline processing are disclosed in, for example, Japanese Laid-Open Publication No. 3-76398 and Japanese Laid-Open Publication No. 10-334225.

Now, a method disclosed in Japanese Laid-Open Publication No. 3-76398 is described. In the case where the encoding is performed according to this method, as shown in a block diagram of FIG. 15 and in a timing chart of FIG. 16, at time T1 when all the processing for image data in a DCT processing section 101 and a quantization processing section 102 are completed, writing the processing results from the quantization processing section 102 into a FIFO memory 103 is begun. At the same time, reading data from the FIFO memory 103 and inputting the data into a Huffman-encoding processing section 104 is begun. Then, at time T2 when the writing of the processing results from the quantization processing section 102 into the FIFO memory 103 is completed, next image data is input to the DCT processing section 101 to start DCT processing thereof.

Furthermore, in the case where decoding is performed, as shown in a block diagram of FIG. 17 and in a timing chart of FIG. 18, at time T3 when all processing for the compressed image data input to a Huffman-decoding processing section 108 is completed, writing the processing results from the Huffman-decoding processing section 108 into a FIFO memory 107 is begun. At the same time, reading data from the FIFO memory 107 and inputting the data into an inverse quantization processing section 106 and an inverse DCT processing section 105 is begun. Then, at time T4 when writing the processing results from the Huffman-decoding processing section 108 into the FIFO memory 107 is completed, next compressed image data is input to the Huffman-decoding processing section 108 to start Huffman-decoding processing thereof.

According to a method disclosed in Japanese Laid-Open Publication No. 10-334225, as shown in a block diagram of FIG. 19 and in a timing chart of FIG. 20, a plurality of processings are assigned to a plurality of stages, i.e., a processing stage (i) 202 and a processing stage (i+1) 204. For that purpose, a double buffer is provided between the processing stages 202 and 204. The double buffer is formed by two buffers 203a and 203b each having a size capable of storing the processing result of the respective processing stages. These buffers 203a and 203b are controlled by local control devices 216 and 217 and a general control device 218.

In particular, the general control device 218 controls the switching between the buffers 203a and 203b and the start of processing at the respective processing stages 202 and 204 by: an LSTART signal according to the predetermined longest processing time at each of the processing stages; an EMPTY signal which indicates the presence of input data in an input buffer 201; and a FULL signal which indicates the presence of output data in an output buffer 205. Once the local control devices 216 and 217 are commanded by the LSTART signal from the general control device 218 to start processing, the local control devices 216 and 217 are operated separately from each other and from the general control device 218 during a processing time of a processing stage which consumes the predetermined longest processing time amongst the processing stages. In this way, double control by the local control devices 216 and 217 and the general control device 218 deconcentrates the load imposed on the control devices.

More specifically, at time T5, the processing at the processing stage (i) 202 is begun, and then its processing result R(1) is written into the buffer 203a. At time T6 when the processing at the processing stage (i) 202 is completed, the processing at the subsequent processing stage (i+1) 204 is begun, and then its processing result R(2) is written into the buffer 203b. Moreover, at a predetermined time during the processing at the subsequent processing stage (i+1) 204, the processing result R(1) is read out from the buffer 203a. By repeating this procedure, processing at a processing stage which consumes the longest processing time amongst the processing stages 202 and 204 can be executed without interrupted or stopped.

According to the method disclosed in Japanese Laid-Open Publication No. 3-76398, the DCT processing and the quantization processing are performed in parallel with the Huffman-encoding processing. Moreover, the Huffman-decoding processing is performed in parallel with the inverse quantization process and the inverse DCT processing.

However, in the encoding process, during the writing of data into the FIFO memory 103 (T2–T1: see FIG. 16), the DCT processing, the quantization processing, and the Huffman-encoding processing are stopped. That is, high speed processing is not appropriately achieved. Similarly, in the decoding process, during the writing of data into the FIFO memory 107 (T4–T3: see FIG. 18), the inverse quantization processing and the inverse DCT processing are stopped. That is, high speed processing is not appropriately achieved.

Furthermore, in the encoding process, at time Ti when all the processing for the image data input to the DCT processing section 101 and to the quantization processing section 102 is completed, writing the processing results from the DCT processing section 101 and the quantization processing section 102 in the FIFO memory 103 is begun, and at the same time, reading data from the FIFO memory 103 and inputting the data into the Huffman-encoding processing section 104 is begun. However, in this method, when the write cycle and the read cycle are equal, the address for writing according to the column direction order overtakes the address for reading according to the zigzag-scan order or the alternate-scan order. In such a case, it is impossible to read all of the DCT processing results which have been written into the memory 103 according to the column direction order. Thus, accurate encoding processing cannot be performed.

Similarly, in the decoding process, at time T3 when all the processing for compressed image data input to the Huffman-decoding processing section 108 is completed, writing the processing results from the Huffman-decoding processing section 108 into the FIFO memory 107 is begun, and at the same time, reading data from the FIFO memory 107 is begun. Accordingly, when the write cycle and the read cycle are equal, the address for writing according to the zigzag-scan order or the alternate-scan order overtakes the address for reading according to the column direction order. In such a case, it is impossible to read all of the DCT processing results which have been written into the memory 103 according to the zigzag-scan order or the alternate-scan order. Thus, accurate decoding processing cannot be performed.

On the other hand, the method disclosed in Japanese Laid-Open Publication No. 10-334225 uses the double buffer formed by two buffers 203a and 203b each having a size capable of storing the processing result of the respective processing stages 202 and 204. In such a structure, the processing at the processing stage 202 and the processing at the processing stage 204 are continuously performed without interruption therebetween, whereby high speed processing is appropriately achieved. Moreover, all the processing results are read out, whereby accurate encoding/decoding is performed. However, it is necessary to provide two buffers 203a and 203b for respectively storing the processing results of the processing stages 202 and 204. Thus, the circuitry size cannot be reduced.

SUMMARY OF THE INVENTION

According to one aspect of the present invention, an image processing device includes: a DCT processing section which performs two-dimensional discrete cosine transform processing on digital image data; a quantization processing section for quantizing the image data which has undergone the two-dimensional DCT processing in the DCT processing section; a memory for storing the image data which has been quantized in the quantization processing section; a Huffman-encoding processing section for Huffman-encoding the image data read out from the memory to compress the image data; and an encoding control section which outputs a signal (DCTSTART) for beginning the processing of the DCT processing section, a signal (QSTART) for beginning the processing of the quantization processing section, and a signal (HUFFSTART) for beginning the processing of the Huffman-encoding processing section as well as a write control signal for writing the quantized image data into the memory and a read control signal for reading the image data from the memory for the Huffman-encoding processing, wherein the memory is a two-port memory which has a writing port and a reading port independent from each other and a capacity which can contain data for one block formed by M×N pixels (where M and N are positive natural numbers, and M≠N−1), and in the case where the data for one block is written into the memory according to a column direction order in response to the write control signal from the encoding control section, and the data for one block is read out from the memory according to a zigzag-scan order or an alternate-scan order in response to the read control signal from the encoding control section, a time difference between a time to start writing the data into the memory and a time to start reading the data from the memory is controlled by the write control signal and the read control signal such that all of the data written into the memory can be read out.

In one embodiment of the present invention, the memory can contain data for one block formed by 8×8 pixels, i.e., M=N=8.

In another embodiment of the present invention, in the case where a delay between a time to start generating the result of the quantization processing in the quantization processing section and a time to start writing the generated result into the memory is β cycles, and a time difference between the start of writing of the result of the quantization processing and the end of reading of the result of the quantization processing is α cycles, α being set to a value which satisfies an expression:

$$28<\alpha<(36+\beta),$$

so that when a write cycle and a read cycle are equal, and a reading order is the zigzag-scan order, an address for writing never overtakes an address for reading.

In still another embodiment of the present invention, in the case where a delay between a time to start generating the result of the quantization processing in the quantization processing section and a time to start writing the generated result into the memory is β cycles, and a time difference between the start of writing of the result of the quantization processing and the end of reading of the result of the quantization processing is α cycles, α being set to a value which satisfies an expression:

$$10<\alpha<(58+\beta),$$

so that when a write cycle and a read cycle are equal, and a reading order is the alternate-scan order, an address for writing never overtakes an address for reading.

According to another aspect of the present invention, an image processing device includes: a Huffman-decoding processing section for Huffman-decoding a compressed image data; a memory for storing the image data which has undergone the Huffman-decoding processing in the Huffman-decoding processing section; an inverse quantization processing section for inversively quantizing the Huffman-decoded image data read out from the memory; an inverse DCT processing section which performs two-dimensional inverse DCT processing on the image data which has been inversively-quantized in the inverse quantization processing section; and a decoding control section which outputs a signal (IDCTSTART) for beginning processing of the inverse DCT processing section, a signal (IQSTART) for beginning processing of the inverse quantization processing section, and a signal (IHUFFSTART) for beginning processing of the Huffman-decoding processing section as well as a write control signal for writing the Huffman-decoded image data into the memory and a read control signal for reading the image data from the memory for the inverse quantization processing, wherein the memory is a two-port memory which has a writing port and a reading port independent from each other and a capacity which can contain data for one block formed by M×N pixels (where M and N are positive natural numbers, and M≠N−1), and in the case where the data for one block is written into the memory according to a zigzag-scan order or a alternate-scan order in response to the write control signal from the encoding control section, and the data for one block is read out from the memory according to a column direction order in response to the read control signal from the decoding control section, a time difference between a time to start writing the data into the memory and a time to start reading the data from the memory is controlled by the write control signal and the read control signal such that all of the data written into the memory can be read out.

In one embodiment of the present invention, the memory can contain data for one block formed by 8×8 pixels, i.e., M=N=8.

In another embodiment of the present invention, in the case where a delay between a time to start generating the result of the Huffman-decoding processing and a time to start writing the generated result into the memory is β cycles, and a time difference between the start of writing of the result of the Huffman-decoding processing and the end of reading of the result of the Huffman-decoding processing is α cycles, α being set to a value which satisfies an expression:

$$28<\alpha<(36+\beta),$$

so that when a write cycle and a read cycle are equal, and a writing order is the zigzag-scan order, an address for writing never overtakes an address for reading.

In still another embodiment of the present invention, in the case where a delay between a time to start generating the result of the Huffman-decoding processing and a time to start writing the generated result into the memory is β cycles, and a time difference between the start of writing of the result of the Huffman-decoding processing and the end of reading of the result of the Huffman-decoding processing is α cycles, α being set to a value which satisfies an expression:

$$10<\alpha<(58+\beta),$$

so that when a write cycle and a read cycle are equal, and a writing order is the alternate-scan order, an address for writing never overtakes an address for reading.

According to still another aspect of the present invention, an image processing device includes: a DCT/inverse DCT processing section which is capable of performing both two-dimensional DCT processing on digital image data and two-dimensional inverse DCT processing on compressed image data and which is commonly utilized for the respective processings; a quantization/inverse quantization processing section which is capable of performing both quantization processing on the DCT-processed image data and inverse quantization processing on the inversively DCT-processed image data and which is commonly utilized for the respective processings; a Huffman-encoding/Huffman-decoding processing section which is capable of performing both Huffman-encoding processing on the quantized image data and Huffman-decoding processing on the inversively-quantized image data and which is commonly utilized for the respective processings; a two-port memory which has a writing port and a reading port independent from each other and a capacity which can contain data for one block formed by M×N pixels (where M and N are positive natural numbers, and M≠N−1); a selector for selecting data to be written into the two-port memory in response to a select signal which triggers encoding/decoding processing; and an encoding/decoding control section which outputs a processing start signal (DCTSTART or IDCTSTART) for the DCT/inverse DCT processing section, a processing start signal (QSTART or IQSTART) for the quantization/inverse quantization processing section, and a processing start signal (HUFFSTART or IHUFFSTART) for the Huffman-encoding/Huffman-decoding processing section as well as a write control signal and a read control signal to the two-port memory, wherein in the case where the select signal triggers encoding processing, the encoding/decoding control section sends a write control signal to the memory in order to write data for one block into the memory according to a column direction order and sends a read control signal to the memory in order to read data for one block from the memory according to a zigzag-scan order or an alternate-scan order; in the case where the select signal triggers decoding processing, the encoding/decoding control section sends a write control signal to the memory in order to write data for one block into the memory according to the zigzag-scan order or the alternate-scan order and sends a read control signal to the memory in order to read data for one block from the memory according to the column direction order; and in both of the encoding processing and the decoding processing, a time difference between a time to start writing the data into the memory and a time to start reading the data from the memory is controlled by the write control signal and the read control signal such that all of the data written into the memory can be read out.

In one embodiment of the present invention, the memory can contain data for one block formed by 8×8 pixels, i.e., M=N=8.

In another embodiment of the present invention, in the case where a delay between a time to start generating the result of the Huffman-decoding processing and a time to start writing the generated result into the memory is $\beta$ cycles, and a time difference between the start of writing the result of the Huffman-decoding processing and the end of reading the result of the Huffman-decoding processing is $\alpha$ cycles, in encoding processing: when a write cycle and a read cycle are equal, and a reading order is the zigzag-scan order, $\alpha$ is set to a value which satisfies an expression, $$28<\alpha<(36+\beta),$$

so that an address for writing never overtakes an address for reading; and when a write cycle and a read cycle are equal, and a reading order is the alternate-scan order, $\alpha$ is set to a value which satisfies an expression, $$10<\alpha<(58+\beta),$$

so that an address for writing never overtakes an address for reading, and in decoding processing: when a write cycle and a read cycle are equal, and a writing order is the zigzag-scan order, $\alpha$ is set to a value which satisfies an expression, $$28<\alpha<(36+\beta),$$

so that an address for writing never overtakes an address for reading; and when a write cycle and a read cycle are equal, and a writing order is the alternate-scan order, $\alpha$ is set to a value which satisfies an expression, $$10<\alpha<(58+\beta),$$

so that an address for writing never overtakes an address for reading.

In an image processing device according to the present invention, in the case where coding (compression of images) is performed, a time difference between the time to start writing quantized data into a two-port memory having a capacity to store data for one block and having a writing port and a reading port independent from each other and the time to start reading the quantized data from the memory is controlled such that all of the quantized data for one block which has been written into the memory according to a column direction order can be read out according to a zigzag-scan order or an alternate-scan order. Thus, according to the present invention, even in a structure employing a single two-port memory, when DCT processing is continuously performed without interruption, it is possible to read all of the data from the memory by appropriately controlling the time difference between the start of writing and the end of reading.

In the case where decoding (decompression of images) is performed, a time difference between the time to start writing Huffman-decoded data for one block into a two-port memory having a capacity to store data for one block and having a writing port and a reading port independent from each other and the time to start reading the Huffman-decoded data for one block from the memory is controlled such that all of the Huffman-decoded data for one block which has been written into the memory according to a zigzag-scan order or an alternate-scan order can be read out according to a column direction order. Thus, according to the present invention, even in a structure employing a single two-port memory, when inverse DCT processing is continuously performed without interruption, it is possible to read all of the data from the memory by appropriately controlling the time difference between the start of writing and the end of reading.

The time difference between the start of writing data into a memory and the end of reading the data from the memory when the data is stored in the memory on the units of a block formed by 8×8 pixels is described below.

Assume that the delay between the time to start the generation of data to be written into the memory and the time to start writing the generated data into the memory is $\beta$ cycles, and the time difference between the start of writing and the end of reading is $\alpha$ cycles. In the case of coding (compression of images), when the write cycle and the read cycle are equal, and the reading order is a zigzag-scan order, the address for writing never overtakes the address for reading so long as $\alpha$ is set to a value which satisfies the following expression:

$$28<\alpha<(36+\beta).$$

When the write cycle and the read cycle are equal, and the reading order is an alternate-scan order, the address for writing never overtakes the address for reading so long as α is set to a value which satisfies the following expression:

$$10<\alpha<(58+\beta).$$

In the case of decoding (decompression of images), when the write cycle and the read cycle are equal, and the writing order is a zigzag-scan order, the address for writing never overtakes the address for reading so long as α is set to a value which satisfies the following expression:

$$28<\alpha<(36+\beta).$$

When the write cycle and the read cycle are equal, and the reading order is an alternate-scan order, the address for writing never overtakes the address for reading so long as α is set to a value which satisfies the following expression:

$$10<\alpha<(58+\beta).$$

Thus, the invention described herein makes possible the advantages of providing an image processing device: which can increase the processing speed of pipeline processing performed between discrete cosine transform processing/inverse discrete cosine transform processing and Huffman-encoding processing/Huffman-decoding processing for compression/expansion of color images; which achieves accurate encoding/decoding; and which decreases the size of the circuitry.

This and other advantages of the present invention will become apparent to those skilled in the art upon reading and understanding the following detailed description with reference to the accompanying figures.

BRIEF DESCRIPTION OF THE DRAWINGS

FIGS. 3A and 3B are tables each showing an exemplary addressing order when data is written into a memory according to the column direction order and data is read from the memory according to a zigzag-scan order in the image compression processing device of FIG. 1.

FIGS. 4A and 4B are tables each showing an exemplary addressing order when data is written into a memory according to the column direction order and data is read from the memory according to a zigzag-scan order in the image compression processing device of FIG. 1.

FIG. 6 is an operation timing chart for decoding processing in the image decompression processing device of FIG. 5.

FIGS. 7A and 7B are tables each showing an exemplary addressing order when data is written into a memory according to a zigzag-scan order and data is read from the memory according to the column direction order in the image decompression processing device of FIG. 5.

FIGS. 8A and 8B are tables each showing an exemplary addressing order when data is written into a memory according to a zigzag-scan order and data is read from the memory according to the column direction order in the image decompression processing device of FIG. 5.

FIG. 12 illustrates an accessing order when the processing result of a block formed by 8×8 pixels is accessed according to the column direction order.

FIG. 13 illustrates an accessing order when the processing result of a block formed by 8×8 pixels is accessed according to a zigzag-scan order.

FIG. 14 illustrates an accessing order when the processing result of a block formed by 8×8 pixels is accessed according to an alternate-scan order.

FIG. 20 is an operation timing chart for encoding processing in the encoding processing device of FIG. 19.

DESCRIPTION OF THE PREFERRED EMBODIMENTS

Hereinafter, embodiments of the present invention will be described with reference to the drawings.

(Embodiment 1)

Figure 1:
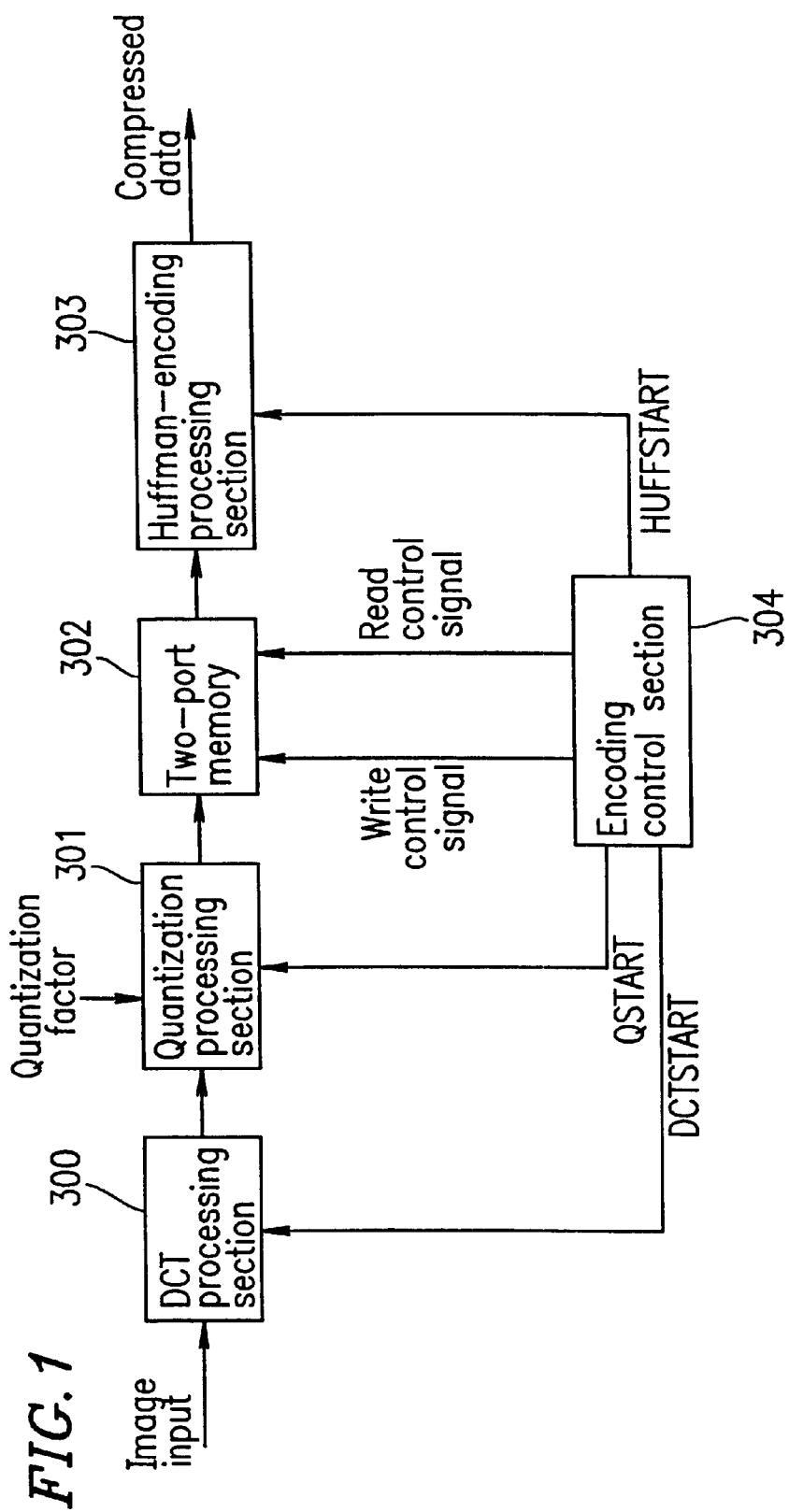
FIG. 1 is a block diagram showing a structure of an image compression processing device which is an example of an image processing device according to embodiment 1 of the present invention.

Embodiment 1 of the present invention is described with reference to FIGS. 1–4B. FIG. 1 is a block diagram showing a structure of an image compression processing device which is an example of an image processing device according to embodiment 1 of the present invention. As shown in FIG. 1, the image compression processing device includes: a DCT processing section 300 which performs two-dimensional DCT processing on input digital image data on the units of a block formed by 8×8 pixels; a quantization processing section 301 for quantizing the image data which has been obtained after the two-dimensional DCT processing according to a quantization factor into image data components; a memory 302 for storing the image data components; a Huffman-encoding processing section 303 for Huffman-encoding an image data component read out from the memory 302 to generate compressed data; and an encoding control section 304 mainly for controlling the operation timing of the above sections.

The memory 302 is a two-port memory which has a writing port and a reading port independent from each other and has a capacity which can contain data for a block formed by 8×8 pixels. The encoding control section 304 generates a signal for starting processing in the DCT processing section 300 (DCTSTART); a signal for starting processing in the quantization processing section 301 (QSTART); and a signal for starting processing in the Huffman-encoding processing section 303 (HUFFSTART). Furthermore, the encoding control section 304 generates a write control signal for writing quantized data into the memory 302 and a read control signal for reading data from the memory 302 for subsequent Huffman-encoding processing.

Figure 2:
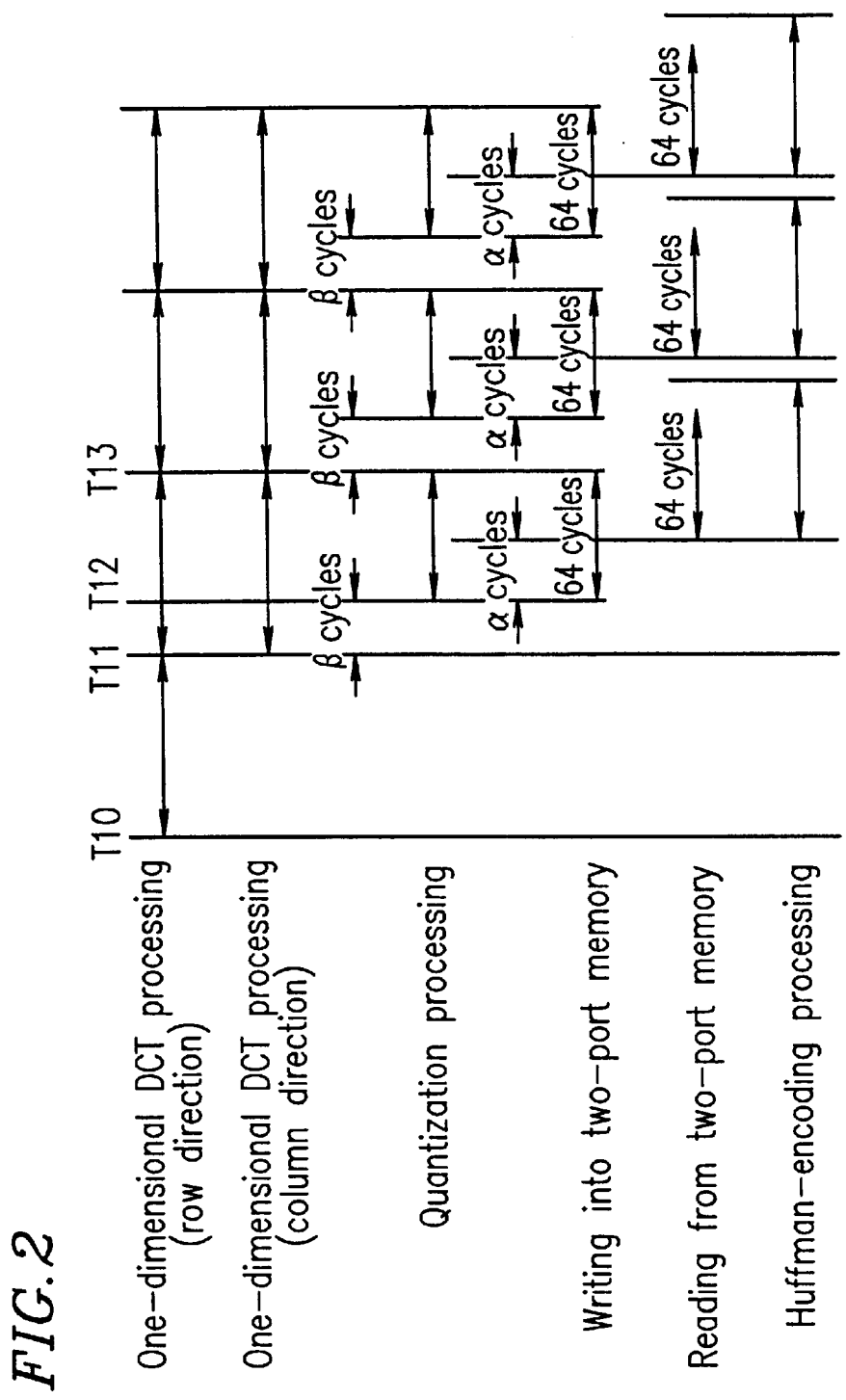
FIG. 2 is an operation timing chart for encoding processing in the image compression processing device of FIG. 1.

In the image compression processing device according to embodiment 1, the DCT processing section 300, the quantization processing section 301, the memory 302, and the Huffman-encoding processing section 303 are controlled by the encoding control section 304 according to the operation timing shown in FIG. 2.

As shown in FIG. 2, in the DCT processing section 300 which performs two-dimensional DCT processing on the units of a block formed by 8×8 pixels, one-dimensional DCT processing according to the row direction order is begun at time T10 in response to a processing start signal (DCTSTART) from the encoding control section 304.

At time T11, the one-dimensional DCT processing according to the row direction order is completed, and at the same time, one-dimensional DCT processing according to the column direction order for the result of the one-dimensional DCT processing according to the row direction order is begun, i.e., two-dimensional DCT processing is begun for a first block formed by 8×8 pixels. The result of the one-dimensional DCT processing according to the column direction order is output according to the column direction order as shown in FIG. 12.

At time T12, which is β cycles after time T11, the quantization processing section 301 begins receiving the result of the one-dimensional DCT processing according to the column direction order, i.e., the result of the two-dimensional DCT processing, for quantization processing with a quantization factor. At the same time, the quantization processing section 301 begins quantization processing in response to a processing start signal from the encoding control section 304 (QSTART). The results of the quantization processing are sequentially written into the two-port memory 302. Therefore, the addressing order for writing the results of the quantization processing is the column direction order shown in FIG. 12.

Figures 12, 13:
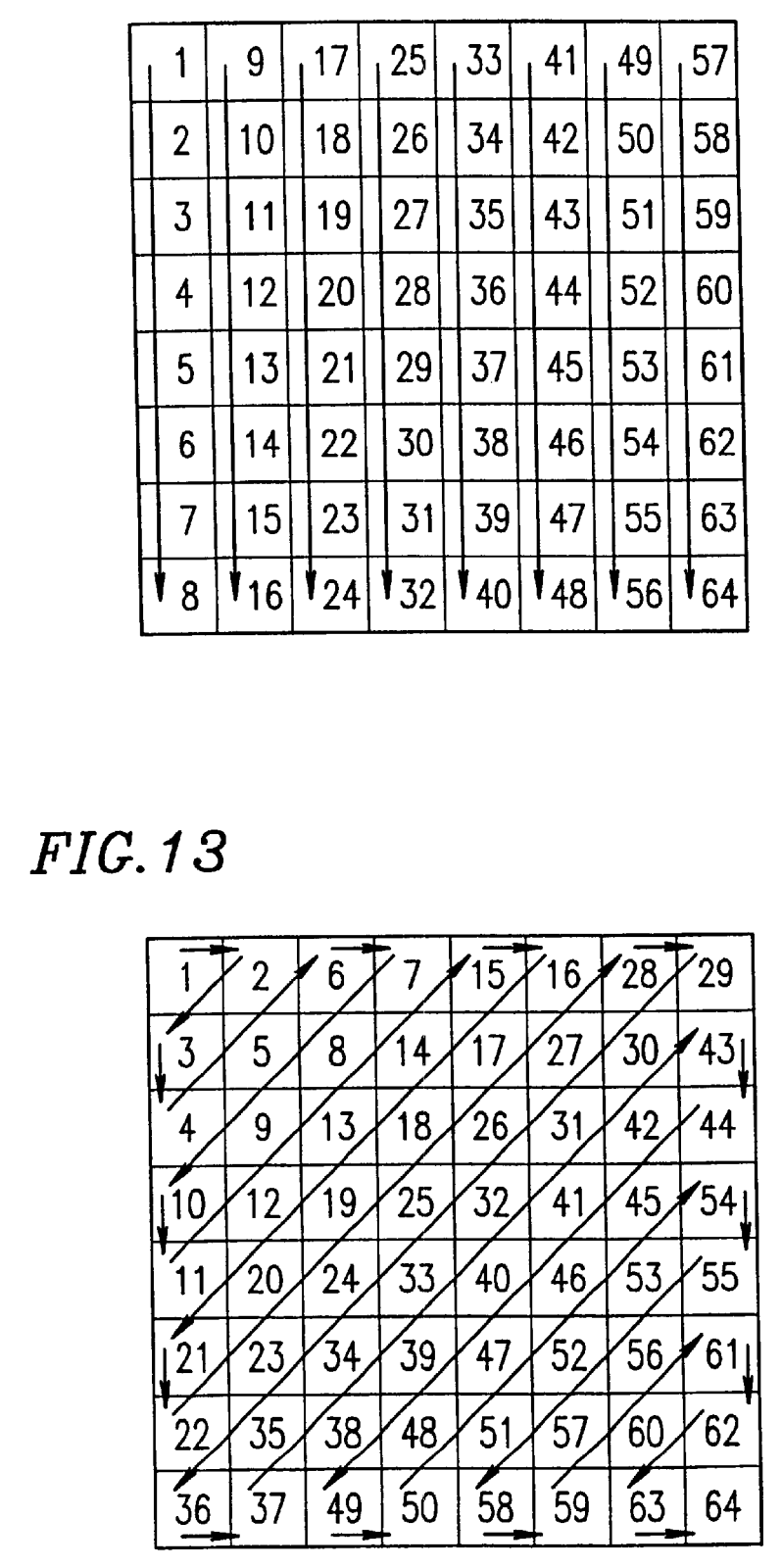

At a time α cycles after time T12 when writing of the result of the quantization processing into the memory 302 was begun, reading the result of the quantization processing from the memory 302 is begun according to the zigzag-scan order as shown in FIG. 13.

The results of the quantization processing which have been read out from the memory 302 are sequentially input to the Huffman-encoding processing section 303. In the Huffman-encoding processing section 303, Huffman-encoding processing is begun in response to a processing start signal from the encoding control section 304 (HUFFSTART).

Especially important in such a timing control is the α cycles between time T12 when writing of the result of the quantization processing into the memory 302 is begun according to the column direction order and the time to start reading the result of the quantization processing from the memory 302 according to the zigzag-scan order. The variable α is set so that when the write cycle and the read cycle are equal, the address for writing according to the column direction order does not overtake the address for reading according to the zigzag-scan order With such a setting, all the results of the one-dimensional DCT processing which have been written into the memory 302 according to the column direction order can be read out according to the zigzag-scan order. In the case where a single block is formed by 8×8 pixels, this condition is represented by expression (5):

$$28 < \alpha < (36+\beta) \quad (5)$$

where β is the number of cycles between time T11 when the one-dimensional DCT processing according to the column direction order (i.e., the two-dimensional DCT processing) is begun and time T12 when the quantization processing section 301 starts receiving the result of the one-dimensional DCT processing according to the column direction order (i.e., the result of the two-dimensional DCT processing). That is, β denotes the delay of the time to start writing data into the memory 302 (time T11) with respect to the time to start the generation of data to be written into the memory 302 (time T12).

FIG. 3A shows an operation of write addresses and read addresses when β is 29 and α (α denotes the number of cycles between time T12 and the time to start reading the result of the quantization processing from the two-port memory 302 according to the zigzag-scan order) is 29. The addresses shown in FIG. 3A are based on the addresses shown in FIG. 12.

FIG. 4A shows an operation of write addresses and read addresses when β is 0 and α is 35. The addresses shown in FIG. 4A are also based on the addresses shown in FIG. 12.

In each of the addressing operations shown in FIGS. 3A and 4A, since α satisfies expression (5), the write address for writing according to the column direction order never overtakes the read address for reading according to the zigzag-scan order. Thus, all the results of the one-dimensional DCT processing which have been written into the memory 302 according to the column direction order can be read out according to the zigzag-scan order.

FIG. 3B shows an operation of write addresses and read addresses when β is 28, and α is 28, which does not satisfy expression (5). The schedule of FIG. 3B shows that when the 57th address is written into, the 57th address is to be read out. That is, the 57th address cannot be read out.

FIG. 4B shows an operation of write addresses and read addresses when β is 0, and α is 36, which does not satisfy expression (5). The schedule of FIG. 4B shows that when the 8th address is written in, the 8th address is to be read out. That is, the 8th address cannot be read out.

In the case where α satisfies expression (5), at time T13, in response to processing start signals from the encoding control section 304 (DCTSTART and QSTART), one-dimensional DCT processing according to the column direction order is completed, and at the same time, quantization processing on a 64 (8×8) pixel component and writing of the results of the quantization processing into the memory 302 is completed. Therefore, at time T13, it is possible to start one-dimensional DCT processing on a next block formed by 8×8 pixels according to the column direction. That is, DCT processing is continuously performed without interrupted.

Figure 14:
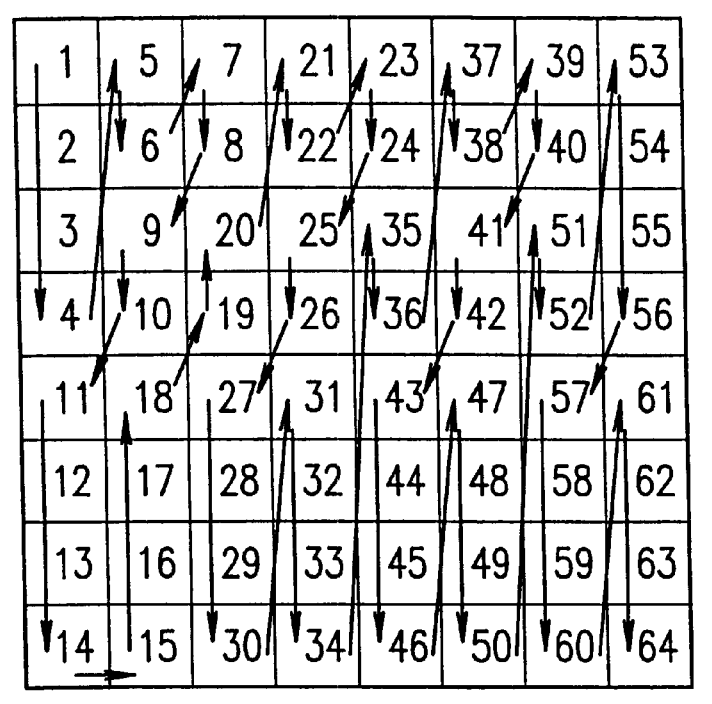

Alternatively, in the case where the order to read the results of the quantization processing from the memory 302 is the alternate-scan order shown in FIG. 14, when processing is performed on the units of a block formed by 8×8 pixels, the write address for writing according to the column direction order never overtakes the read address for reading according to the alternate-scan order so long as α satisfies expression (6):

$$10 < \alpha < (58+\beta) \quad (6)$$

When expression (6) is satisfied, it is possible to read all of the results of the one-dimensional DCT processing which have been written into the memory 302 according to the column direction order. It should be noted that the write cycle and the read cycle are equal.

(Embodiment 2)

Figure 5:
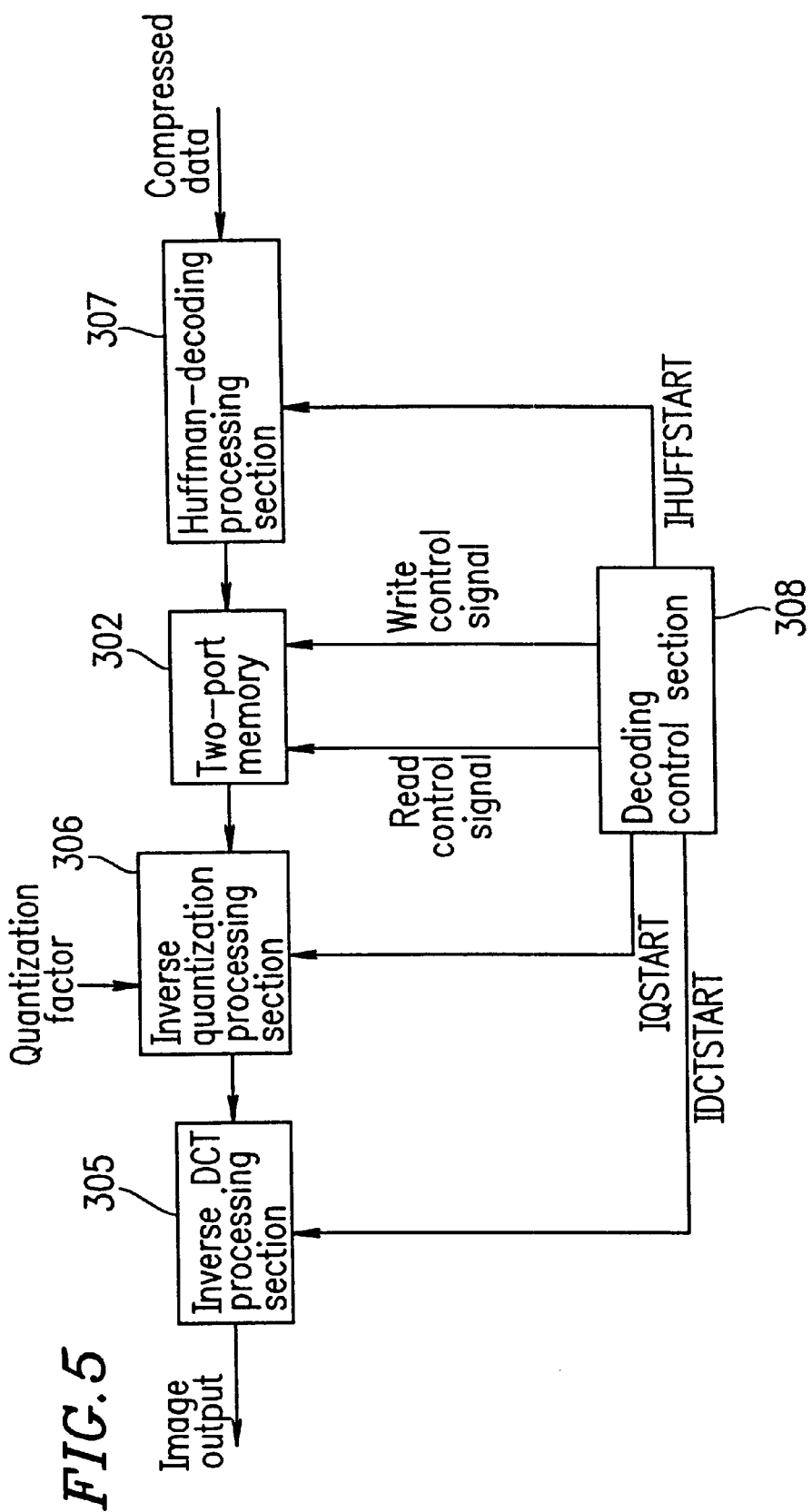
FIG. 5 is a block diagram showing a structure of an image decompression processing device which is an example of an image processing device according to embodiment 2 of the present invention.

Embodiment 2 of the present invention is described with reference to FIGS. 5–8B. An image processing device according to embodiment 2 is an image decompression processing device for decompressing compressed data. As shown in FIG. 5, the image decompression processing device includes: a Huffman-decoding processing section 307 for Huffman-decoding a compressed digital image data component on the units of a block formed by 8×8 pixels into an image data component; a memory 302 for storing the image data component obtained after the Huffman-decoding processing; an inverse quantization processing section 306 for inversively quantizing image data components read out from the memory 302 into image data according to a quantization factor; an inverse DCT processing section 305 which performs two-dimensional inverse DCT processing on the image data obtained after the inverse quantization processing; and a decoding control section 308 mainly for controlling the operation timing of the above sections.

The memory 302 is a two-port memory which has a writing port and a reading port independent from each other and has a capacity which can contain data for a block formed by 8×8 pixels. The decoding control section 308 generates a signal for beginning processing of the inverse DCT processing section 305 (IDCTSTART); a signal for beginning processing of the inverse quantization processing section 306 (IQSTART); and a signal for beginning processing of the Huffman-decoding processing section 307 (IHUFFSTART). Furthermore, the decoding control section 308 generates a write control signal for writing Huffman-decoded data into the memory 302 and a read control signal for reading data from the memory 302 for subsequent inverse quantization processing.

In the image decompression processing device according to embodiment 2, the Huffman-decoding processing section 307, the memory 302, the inverse quantization processing section 306, and the inverse DCT processing section 305 are controlled by the decoding control section 308 according to the operation timing shown in FIG. 6.

As shown in FIG. 6, in the Huffman-decoding processing section 307 which performs Huffman-decoding processing on the units of a block formed by 8×8 pixels, Huffman-decoding processing is begun at time T20 in response to a processing start signal (IHUFFSTART) from the decoding control section 308.

At time T21, writing of the results of the Huffman-decoding processing into the memory 302 is begun. The addressing order to write the results of the Huffman-decoding processing in the memory 302 is the zigzag-scan order shown in FIG. 13.

At time T22 which is $\alpha$ cycles after time T21, reading of the results of the Huffman-decoding processing from the memory 302 according to the column direction order shown in FIG. 12 is begun. The read results of the Huffman-decoding processing are sequentially supplied to the inverse quantization processing section 306. The inverse quantization processing section 306 begins inverse quantization processing at time T22 in response to a processing start signal from the decoding control section 308 (IQSTART). The results of the inverse quantization processing are sequentially output to the inverse DCT processing section 305.

In the inverse DCT processing section 305, one-dimensional inverse DCT processing according to the column direction order for the results of the inverse quantization processing is begun at time T22 in response to a processing start signal from the decoding control section 308 (IDCTSTART).

At time T23, Huffman-decoding processing for one block formed by 8×8 pixels is completed, and at the same time, writing of the results of the Huffman-decoding processing for the one block into the memory 302 is completed, while Huffman-decoding processing for a next one block formed by 8×8 pixels is started.

At time T24 which is $\beta$ cycles after time T23, writing of the results of the Huffman-decoding processing for the next one block (8×8 pixels) into the memory 302 is begun.

At time T25, which is $\alpha$ cycles after time T24, reading of the results of the Huffman-decoding processing for the next one block from the memory 302 is begun according to the column direction order shown in FIG. 12. The read results of the Huffman-decoding processing are sequentially supplied to the inverse quantization processing section 306. The inverse quantization processing section 306 begins inverse quantization processing at time T25 in response to a processing start signal from the decoding control section 308 (IQSTART). The results of the inverse quantization processing are sequentially output to the inverse DCT processing section 305.

In the inverse DCT processing section 305, one-dimensional inverse DCT processing according to the column direction order for the next one block is begun at time T25 in response to a processing start signal from the decoding control section 308 (IDCTSTART). At the same time, one-dimensional inverse DCT processing according to the row direction order for the first one block (8×8 pixels) is begun, i.e., two-dimensional inverse DCT processing for the first one block (8×8 pixels) is begun.

Especially important in such a timing control is the $\alpha$ cycles between time T21 (time T24) when writing of the result of the Huffman-decoding processing into the memory 302 is begun according to the zigzag-scan order and time T22 (time T25) when reading the result of the Huffman-decoding processing from the memory 302 is begun according to the column direction order. The variable $\alpha$ is set so that when the write cycle and the read cycle are equal, the address for writing according to the zigzag-scan order does not overtake the address for reading according to the column direction order. With such a setting, it is possible to read all of the results of the Huffman-decoding processing which have been written into the memory 302 according to the zigzag-scan order. In particular, $\alpha$ is set to a value which satisfies expression (5).

In expression (5), $\beta$ is the number of cycles between time T23 when the generation of the results of the Huffman-decoding processing is begun and time T24 when writing of the results of the Huffman-decoding processing into the memory 302 is begun. That is, $\beta$ denotes the delay of the time to start writing data into the memory 302 with respect to the time to start the generation of data to be written into the memory 302.

FIG. 7A shows an operation of write addresses and read addresses when $\beta$ is 29 and $\alpha$ ($\alpha$ denotes the number of cycles between time T24 and time T25 when reading the result of the Huffman-decoding processing from the memory 302 is begun) is 29. The addresses shown in FIG. 7A are based on the addresses shown in FIG. 13.

FIG. 8A shows an operation of write addresses and read addresses when $\beta$ is 0 and $\alpha$ is 35. The addresses shown in FIG. 8A are also based on the addresses shown in FIG. 13.

In each of the addressing operations shown in FIGS. 7A and 8A, since $\alpha$ satisfies expression (5), the write address for writing data according to the zigzag-scan order never overtakes the read address for reading data according to the column direction order. Thus, it is possible to read all of the results of the Huffman-decoding processing which have been written into the memory 302 according to the zigzag-scan order.

FIG. 7B shows an operation of write addresses and read addresses when β is 28, and α is 28, which does not satisfy expression (5). The schedule of FIG. 7B shows that when the 36th address is written into, the 36th address is to be read out. That is, the 36th address cannot be read out.

FIG. 8B shows an operation of write addresses and read addresses when β is 0, and α is 36, which does not satisfy expression (5). The schedule of FIG. 8B shows that when the 29th address is written into, the 29th address is to be read out. That is, the 29th address cannot be read out.

In the case where α satisfies expression (5), at time T25, in response to processing start signals from the decoding control section 308 (IDCTSTART and IQSTART), one-dimensional inverse DCT processing according to the column direction order is completed, and at the same time, one-dimensional inverse DCT processing according to the column direction order for the next one block (8×8 pixels) can be begun. That is, inverse DCT processing is continuously performed without interrupted.

Alternatively, in the case where the order to write the results of the Huffman-decoding processing into the memory 302 is the alternate-scan order shown in FIG. 14, the address for writing data according to the alternate-scan order never overtakes the address for reading data according to the column direction order so long as α satisfies expression (7):

$$6 < \alpha < (54 + \beta) \quad (7)$$

When expression (7) is satisfied, it is possible to read all of the results of the Huffman-decoding processing which have been written into the memory 302 according to the alternate-scan order. It should be noted that the write cycle and the read cycle are equal.

(Embodiment 3)

Figure 9:
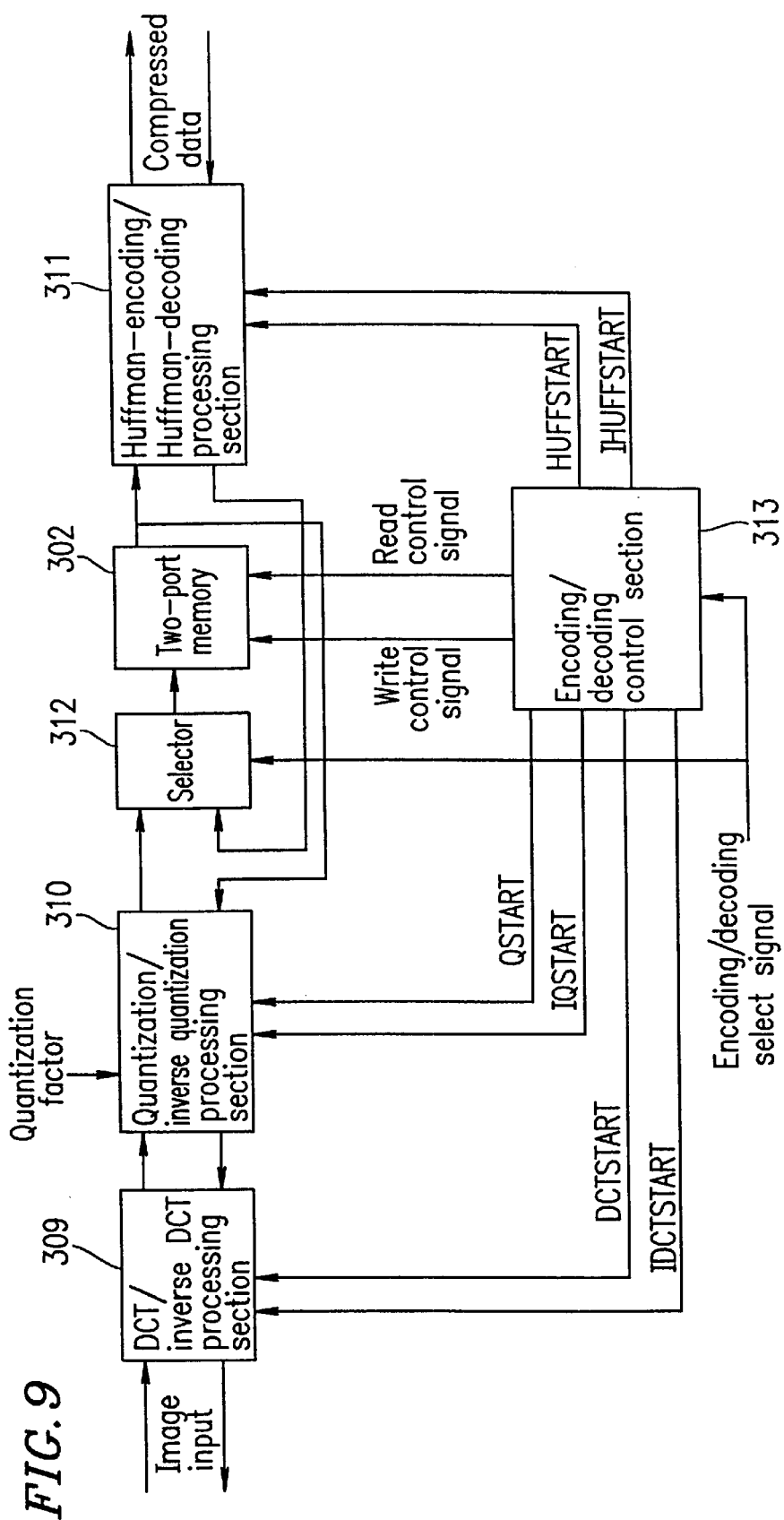
FIG. 9 is a block diagram showing a structure of an image compression/decompression processing device which is an example of an image processing device according to embodiment 3 of the present invention.
Figure 10:
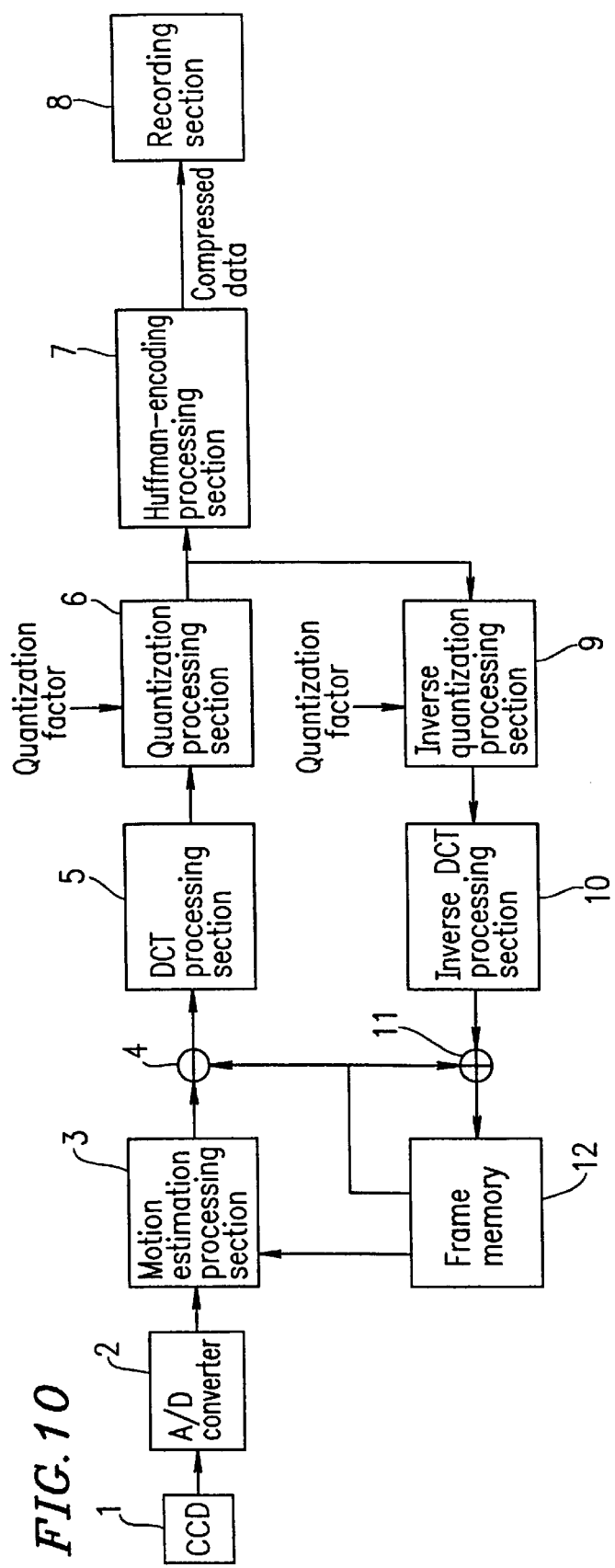
FIG. 10 is a block diagram showing a typical dynamic image encoding process.
Figure 11:
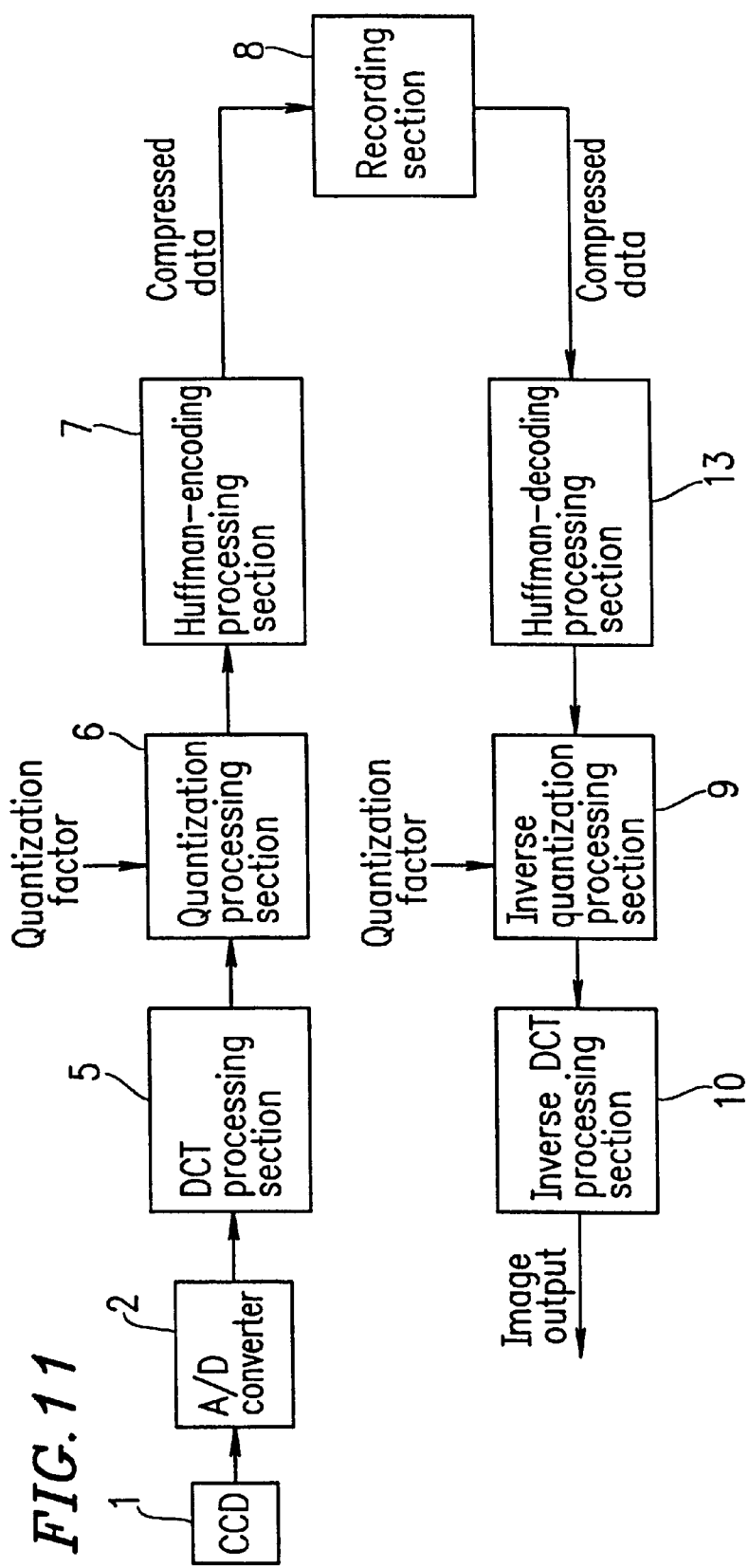
FIG. 11 is a block diagram showing a typical still image encoding/decoding process.
Figure 15:
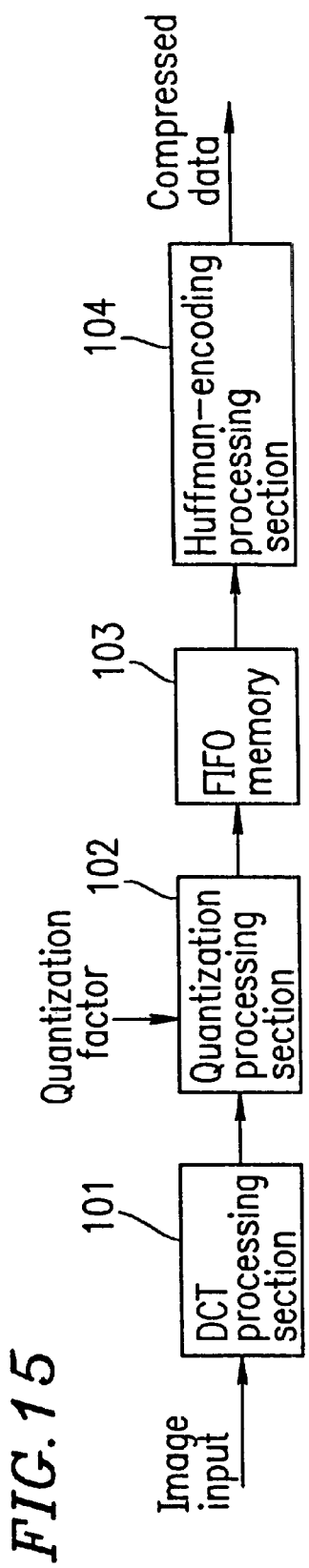
FIG. 15 is a block diagram showing a structure of an encoding processing device which is a conventional image processing device.
Figure 16:
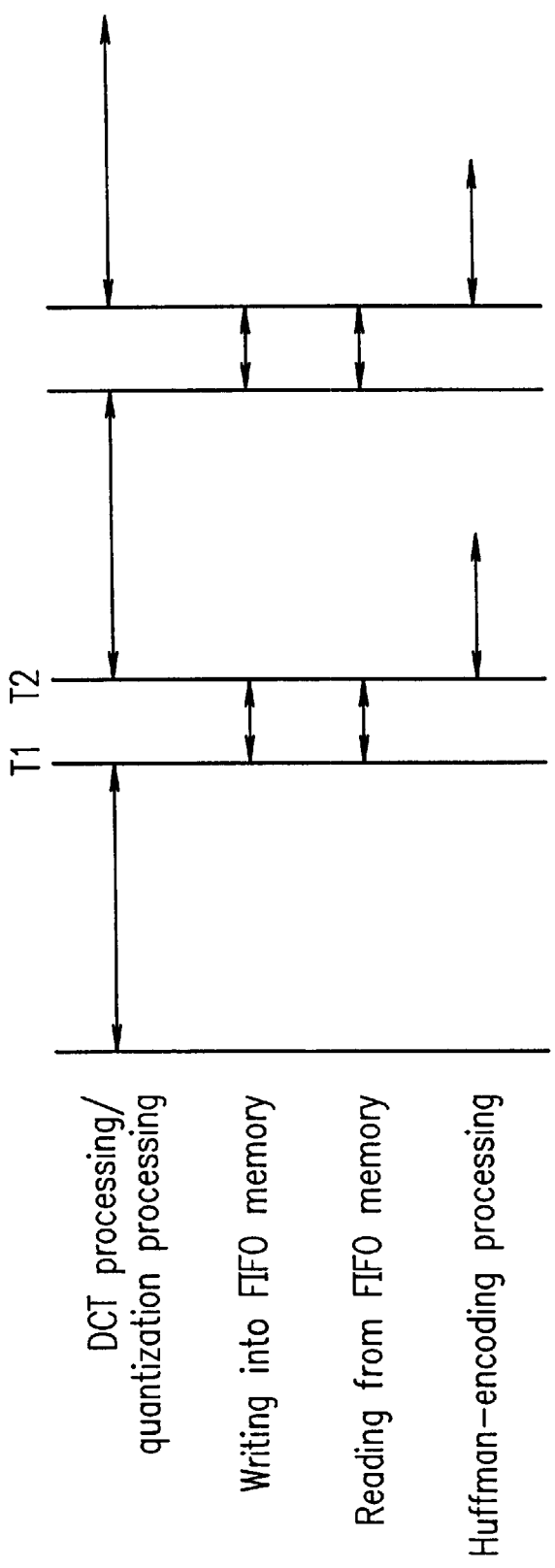
FIG. 16 is an operation timing chart for encoding processing in the encoding processing device of FIG. 15.
Figure 17:
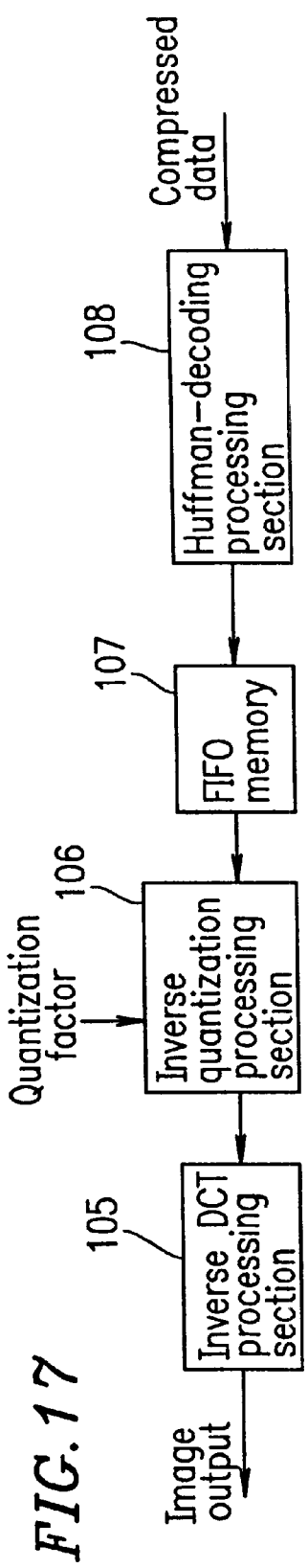
FIG. 17 is a block diagram showing a structure of a decoding processing device which is a conventional image processing device.
Figure 18:
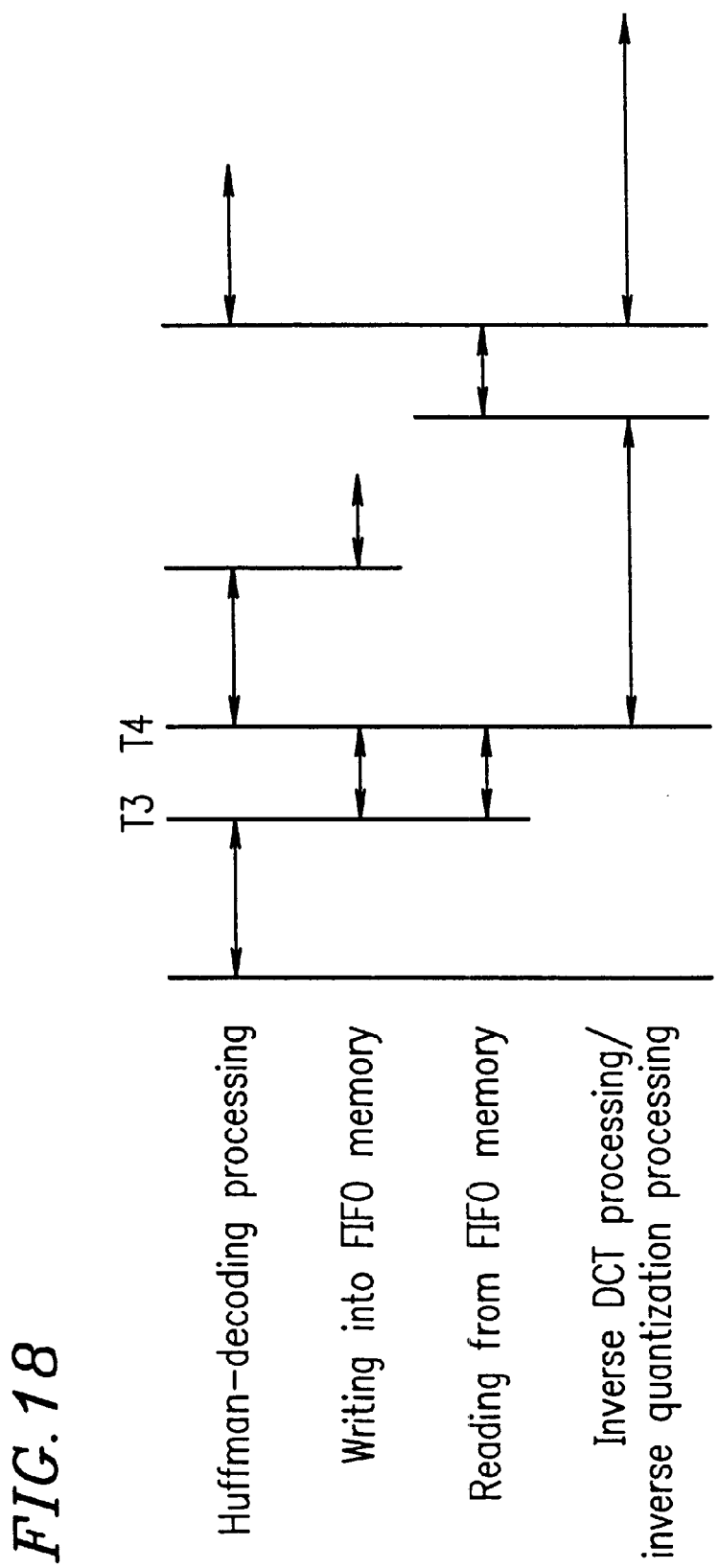
FIG. 18 is an operation timing chart for decoding processing in the decoding processing device of FIG. 17.
Figure 19:
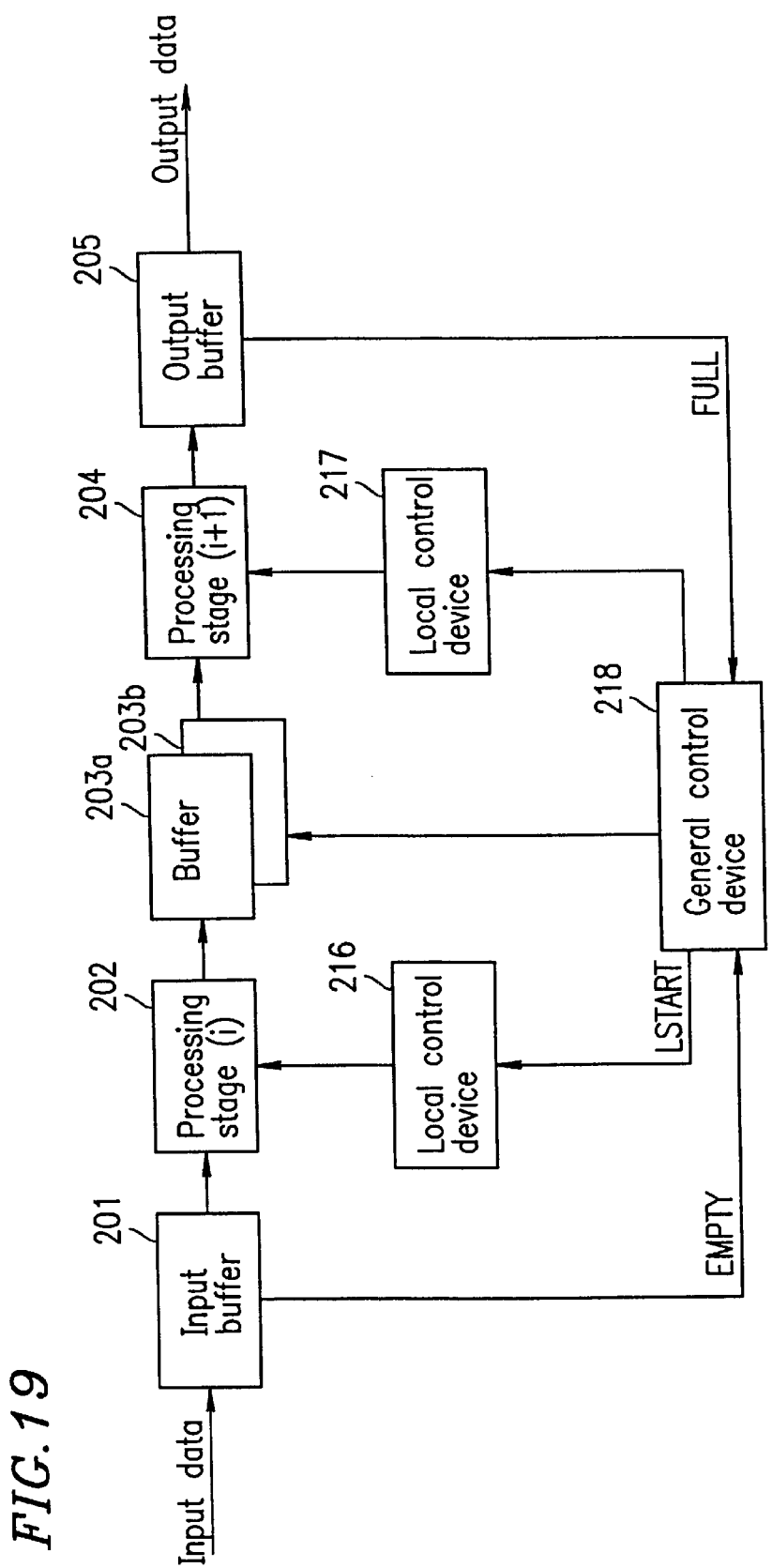
FIG. 19 is a block diagram showing a structure of another encoding processing device which is a conventional image processing device.

FIG. 9 shows an image processing device according to embodiment 3 of the present invention. The image processing device according to embodiment 3 is an image compression/decompression device for compressing/decompressing image data. As shown in FIG. 9, the image compression/decompression processing device includes: a DCT/inverse DCT processing section 309 which is capable of performing both two-dimensional DCT processing and two-dimensional inverse DCT processing and which is commonly utilized for the respective processing; a quantization/inverse quantization processing section 310 which is capable of performing both quantization processing and inverse quantization processing and which is commonly utilized for the respective processing; a Huffman-encoding/Huffman-decoding processing section 311 which is capable of performing both Huffman-encoding processing and Huffman-decoding processing and which is commonly utilized for the respective processing; a two-port memory 302 which has a writing port and a reading port independent from each other and has a capacity which can contain data for a block formed by 8×8 pixels; an encoding/decoding control section 313 for controlling the operation timing of the above elements; and a selector 312 for selecting data to be written into the memory 302.

In response to a select signal for encoding/decoding processing, the encoding/decoding control section 313 generates processing start signals (DCTSTART, QSTART, and HUFFSTART, or IDCTSTART, IQSTART, and IHUFFSTART). Moreover, in response to the select signal for the encoding/decoding processing, the encoding/decoding control section 313 generates a write control signal for writing data into the memory 302 and a read control signal for reading data from the memory 302.

The processing start signals DCTSTART and IDCTSTART trigger two-dimensional DCT processing and two-dimensional inverse DCT processing, respectively, in the DCT/inverse DCT processing section 309. The processing start signals QSTART and IQSTART trigger quantization processing and inverse quantization processing, respectively, in the quantization/inverse quantization processing section 310. The processing start signals HUFFSTART and IHUFFSTART trigger Huffman-encoding processing and Huffman-decoding processing, respectively, in the Huffman-encoding/Huffman-decoding processing section 311.

The selector 312 selects data to be written into the memory 302 in response to an encoding select signal which triggers image compression processing or a decoding select signal which triggers image decompression processing.

That is, in the case of receiving an encoding select signal which triggers encoding processing, the encoding/decoding control section 313 sends a processing start signal DCTSTART to the DCT/inverse DCT processing section 309, and the DCT/inverse DCT processing section 309 starts one-dimensional DCT processing according to the row direction order in response to the processing start signal DCTSTART.

At the same time as the completion of the one-dimensional DCT processing according to the row direction order, one-dimensional DCT processing according to the column direction order is begun for the results of the one-dimensional DCT processing according to the row direction order, i.e., two-dimensional DCT processing is begun for a first block (8×8 pixels). The results of the one-dimensional DCT processing according to the column direction order are output according to the column direction order shown in FIG. 12.

As shown in FIG. 2, β cycles after the completion of the one-dimensional DCT processing according to the row direction order, the quantization/inverse quantization processing section 310 starts receiving the results of the one-dimensional DCT processing according to the column direction order. At the same time, in the quantization/inverse quantization processing section 310, quantization processing is begun in response to a processing start signal QSTART from the encoding/decoding control section 313. The results of the quantization processing in the quantization/inverse quantization processing section 310 are sequentially written into the two-port memory 302. The addressing order for writing the results of the quantization processing into the memory 302 is the column direction order shown in FIG. 12.

As shown in FIG. 2, α cycles after the time when writing into the memory 302 is begun, reading of the results of the quantization processing is begun according to the zigzag-scan order shown in FIG. 13 or the alternate-scan order shown in FIG. 14. The read results of the quantization processing are sequentially input to the Huffman-encoding/Huffman-decoding processing section 311. In the Huffman-encoding/Huffman-decoding processing section 311, Huffman-encoding processing is begun in response to a processing start signal HUFFSTART from the encoding/decoding control section 313.

The variable α (of α cycles between the time to start writing of the results of the quantization processing into the memory 302 according to the column direction order is begun and the time to start reading the results of the quantization processing from the memory 302 according to the zigzag-scan order or the alternate-scan order) is set such that when the write cycle and the read cycle are equal, the address for writing according to the column direction order does not overtake the address for reading according to the zigzag-scan order. In particular, when the reading order is the zigzag-scan order, $\alpha$ is set to $\alpha$ value which satisfies expression (5); and when the reading order is the alternate-scan order, $\alpha$ is set to a value which satisfies expression (6).

With such a setting, as in embodiment 1, all of the results of the one-dimensional DCT processing which have been written into the memory 302 according to the column direction order can be read out according to the zigzag-scan order.

In the case of receiving a decoding select signal which triggers decoding processing, the encoding/decoding control section 313 sends a processing start signal IHUFFSTART to the Huffman-encoding/Huffman-decoding processing section 311, and the Huffman-encoding/Huffman-decoding processing section 311 starts Huffman-decoding processing in response to the processing start signal IHUFFSTART. The addressing order for writing the results of the Huffman-decoding processing into the memory 302 is the zigzag-scan order or the alternate-scan order.

As shown in FIG. 6, $\alpha$ cycles after the time when writing into the memory 302 is begun, reading of the results of the Huffman-decoding processing from the memory 302 is begun according to the column direction order. The read results of the Huffman-decoding processing are sequentially input to the quantization/inverse quantization processing section 310. In the quantization/inverse quantization processing section 310, inverse quantization processing is begun in response to a processing start signal IQSTART from the encoding/decoding control section 313. The results of the inverse quantization processing are sequentially output to the DCT/inverse DCT processing section 309. In the DCT/inverse DCT processing section 309, one-dimensional inverse DCT processing according to the column direction order is begun for the results of the inverse quantization processing in response to a processing start signal IDCTSTART from the encoding/decoding control section 313.

At the same time as the completion of the Huffman-decoding processing, writing of the results of the Huffman-decoding processing into the memory 302 is completed. Then, $\beta$ cycles after the completion of writing into the memory 302, writing of the results of a Huffman-decoding processing for a next one block (8×8 pixels) into the memory 302 is begun. Moreover, a cycles after the start of writing into the memory 302, reading of the results of the Huffman-decoding processing for the next one block from the memory 302 is begun according to the column direction order.

The read results of the Huffman-decoding processing are sequentially output to the quantization/inverse quantization processing section 310. The quantization/inverse quantization processing section 310 starts inverse quantization processing in response to a processing start signal from the encoding/decoding control section 313 (IQSTART). The results of the inverse quantization processing are sequentially output to the DCT/inverse DCT processing section 309.

The variable $\alpha$ (of $\alpha$ cycles between the time to start writing the results of the Huffman-decoding processing into the memory 302 according to the zigzag-scan order or the alternate-scan order and the time to start reading the results of the Huffman-decoding processing from the memory 302 according to the column direction order) is set such that when the write cycle and the read cycle are equal, the address for writing according to the zigzag-scan order or the alternate-scan order does not overtake the address for reading according to the column direction order. In particular, when the writing order is the zigzag-scan order, $\alpha$ is set to a value which satisfies expression (5); and when the writing order is the alternate-scan order, $\alpha$ is set to a value which satisfies expression (7).

With such a setting, as in embodiment 2, all the results of the Huffman-decoding processing which have been written into the memory 302 according to the zigzag-scan order or the alternate-scan order can be read out according to the column direction order.

In embodiments 1–3, the image processing devices which process images on the units of a block formed by 8×8 pixels have been described. However, the present invention is not limited to such image processing devices. The present invention is applicable to image processing devices which process images on the units of a block formed by M×N pixels (where M and N are positive natural numbers, and M≠N−1).

In an image processing device according to the present invention, in the case where coding, i.e., compression of images, is performed, the time difference between the time to start writing quantized data into a two-port memory having a writing port and a reading port independent from each other and the time to start reading the quantized data from the memory is controlled such that all of the quantized data for one block which has been written into the memory according to the column direction order can be read out according to a zigzag-scan order or an alternate-scan order. With such a time control, even in a structure employing a single two-port memory, when DCT processing is continuously performed without interruption, it is possible to read all of the data from the memory. Thus, in pipelined image processing, the increase in processing speed, accurate coding, and the reduction in circuitry size can all be achieved together.

Further, in the case where decoding, i.e., decompression of images, is performed, the time difference between the time to start writing Huffman-decoded data into a two-port memory having a writing port and a reading port independent from each other and the time to start reading the Huffman-decoded data from the memory is controlled such that all of the Huffman-decoded data for one block which has been written in the memory according to a zigzag-scan order or an alternate-scan order can be read out according to the column direction order. With such a time control, even in a structure employing a single two-port memory, when inverse DCT processing is continuously performed without interruption, it is possible to read all of the data from the memory. Thus, in pipelined image processing, the increase in processing speed, accurate coding, and the reduction in circuitry size can all be achieved together.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing device, comprising:
    a DCT processing section which performs two-dimensional discrete cosine transform processing on digital image data;
    a quantization processing section for quantizing the image data which has undergone the two-dimensional DCT processing in the DCT processing section;

a memory for storing the image data which has been quantized in the quantization processing section;

a Huffman-encoding processing section for Huffman-encoding the image data read out from the memory to compress the image data; and an encoding control section which outputs a signal (DCTSTART) for beginning the processing of the DCT processing section, a signal (QSTART) for beginning the processing of the quantization processing section, and a signal (HUFFSTART) for beginning the processing of the Huffman-encoding processing section as well as a write control signal for writing the quantized image data into the memory and a read control signal for reading the image data from the memory for the Huffman-encoding processing, wherein the memory is a two-port memory which has a writing port and a reading port independent from each other and a capacity which can contain data for one block formed by M×N pixels (where M and N are positive natural numbers, and M≠N−1), and in the case where the data for one block is written into the memory according to a column direction order in response to the write control signal from the encoding control section, and the data for one block is read out from the memory according to a zigzag-scan order or an alternate-scan order in response to the read control signal from the encoding control section, a time difference between a time to start writing the data into the memory and a time to start reading the data from the memory is controlled by the write control signal and the read control signal such that all of the data written into the memory can be read out.

2. An image processing device according to claim 1, wherein the memory can contain data for one block formed by 8×8 pixels, i.e., M=N=8.

3. An image processing device according to claim 2, wherein, in the case where a delay between a time to start generating the result of the quantization processing in the quantization processing section and a time to start writing the generated result into the memory is β cycles, and a time difference between the start of writing of the result of the quantization processing and the end of reading of the result of the quantization processing is α cycles, α being set to a value which satisfies an expression:

$$28<\alpha<(36+\beta),$$

so that when a write cycle and a read cycle are equal, and a reading order is the zigzag-scan order, an address for writing never overtakes an address for reading.

4. An image processing device according to claim 2, wherein, in the case where a delay between a time to start generating the result of the quantization processing in the quantization processing section and a time to start writing the generated result into the memory is β cycles, and a time difference between the start of writing of the result of the quantization processing and the end of reading of the result of the quantization processing is α cycles, α being set to a value which satisfies an expression:

$$10<\alpha<(58+\beta),$$

so that when a write cycle and a read cycle are equal, and a reading order is the alternate-scan order, an address for writing never overtakes an address for reading.

5. An image processing device, comprising:

a Huffman-decoding processing section for Huffman-decoding a compressed image data;

a memory for storing the image data which has undergone the Huffman-decoding processing in the Huffman-decoding processing section;

an inverse quantization processing section for inversively quantizing the Huffman-decoded image data read out from the memory;

an inverse DCT processing section which performs two-dimensional inverse DCT processing on the image data which has been inversively-quantized in the inverse quantization processing section; and a decoding control section which outputs a signal (IDCTSTART) for beginning processing of the inverse DCT processing section, a signal (IQSTART) for beginning processing of the inverse quantization processing section, and a signal (IHUFFSTART) for beginning processing of the Huffman-decoding processing section as well as a write control signal for writing the Huffman-decoded image data into the memory and a read control signal for reading the image data from the memory for the inverse quantization processing, wherein the memory is a two-port memory which has a writing port and a reading port independent from each other and a capacity which can contain data for one block formed by M×N pixels (where M and N are positive natural numbers, and M≠N−1), and in the case where the data for one block is written into the memory according to a zigzag-scan order or a alternate-scan order in response to the write control signal from the encoding control section, and the data for one block is read out from the memory according to a column direction order in response to the read control signal from the decoding control section, a time difference between a time to start writing the data into the memory and a time to start reading the data from the memory is controlled by the write control signal and the read control signal such that all of the data written into the memory can be read out.

6. An image processing device according to claim 5, wherein the memory can contain data for one block formed by 8×8 pixels, i.e., M=N=8.

7. An image processing device according to claim 6, wherein, in the case where a delay between a time to start generating the result of the Huffman-decoding processing and a time to start writing the generated result into the memory is β cycles, and a time difference between the start of writing of the result of the Huffman-decoding processing and the end of reading of the result of the Huffman-decoding processing is α cycles, α being set to a value which satisfies an expression:

$$28<\alpha<(36+\beta),$$

so that when a write cycle and a read cycle are equal, and a writing order is the zigzag-scan order, an address for writing never overtakes an address for reading.

8. An image processing device according to claim 6, wherein, in the case where a delay between a time to start generating the result of the Huffman-decoding processing and a time to start writing the generated result into the memory is β cycles, and a time difference between the start of writing of the result of the Huffman-decoding processing and the end of reading of the result of the Huffman-decoding processing is α cycles, α being set to a value which satisfies an expression:

$$10<\alpha<(58+\beta),$$

so that when a write cycle and a read cycle are equal, and a writing order is the alternate-scan order, an address for writing never overtakes an address for reading.

9. An image processing device, comprising:
- a DCT/inverse DCT processing section which is capable of performing both two-dimensional DCT processing on digital image data and two-dimensional inverse DCT processing on compressed image data and which is commonly utilized for the respective processings;
- a quantization/inverse quantization processing section which is capable of performing both quantization processing on the two-dimensional DCT-processed image data and inverse quantization processing on the two-dimensional inversively DCT-processed image data and which is commonly utilized for the respective processings;
- a Huffman-encoding/Huffman-decoding processing section which is capable of performing both Huffman-encoding processing on the quantized image data and Huffman-decoding processing on the inversively-quantized image data and which is commonly utilized for the respective processings;
- a two-port memory which has a writing port and a reading port independent from each other and a capacity which can contain data for one block formed by M×N pixels (where M and N are positive natural numbers, and M≠N−1);
- selector for selecting data to be written into the two-port memory in response to a select signal which triggers encoding/decoding processing; and
- an encoding/decoding control section which outputs a processing start signal (DCTSTART or IDCTSTART) for the DCT/inverse DCT processing section, a processing start signal (QSTART or IQSTART) for the quantization/inverse quantization processing section, and a processing start signal (HUFFSTART or IHUFFSTART) for the Huffman-encoding/Huffman-decoding processing section as well as a write control signal and a read control signal to the two-port memory, wherein
- in the case where the select signal triggers encoding processing, the encoding/decoding control section sends a write control signal to the memory in order to write data for one block into the memory according to a column direction order and sends a read control signal to the memory in order to read data for one block from the memory according to a zigzag-scan order or an alternate-scan order:
- in the case where the select signal triggers decoding processing, the encoding/decoding control section sends a write control signal to the memory in order to write data for one block into the memory according to the zigzag-scan order or the alternate-scan order and sends a read control signal to the memory in order to read data for one block from the memory according to the column direction order; and
- in both of the encoding processing and the decoding processing, a time difference between a time to start writing the data into the memory and a time to start reading the data from the memory is controlled by the write control signal and the read control signal such that all of the data written into the memory can be read out.

10. An image processing device according to claim 9, wherein the memory can contain data for one block formed by 8×8 pixels, i.e., M=N=8.

11. An image processing device according to claim 10, wherein, in the case where a delay between a time to start generating the result of the Huffman-decoding processing and a time to start writing the generated result into the memory is $\beta$ cycles, and a time difference between the start of writing the result of the Huffman-decoding processing and the end of reading the result of the Huffman-decoding processing is $\alpha$ cycles, in encoding processing:
when a write cycle and a read cycle are equal, and a reading order is the zigzag-scan order, $\alpha$ is set to a value which satisfies an expression, $$28<\alpha<(36+\beta),$$

so that an address for writing never overtakes an address for reading; and when a write cycle and a read cycle are equal, and a reading order is the alternate-scan order, $\alpha$ is set to a value which satisfies an expression, $$10<\alpha<(58+\beta),$$

so that an address for writing never overtakes an address for reading, and in decoding processing:
when a write cycle and a read cycle are equal, and a writing order is the zigzag-scan order, $\alpha$ is set to a value which satisfies an expression, $$28<\alpha<(36+\beta),$$

so that an address for writing never overtakes an address for reading; and when a write cycle and a read cycle are equal, and a writing order is the alternate-scan order, $\alpha$ is set to a value which satisfies an expression, $$10<\alpha<(58+\beta),$$

so that an address for writing never overtakes an address for reading.

* * * * *